United States Patent
Jain et al.

(10) Patent No.: US 10,678,448 B2
(45) Date of Patent: *Jun. 9, 2020

(54) DEDUPLICATION OF VIRTUAL MACHINE CONTENT

(71) Applicant: RUBRIK, INC., Palo Alto, CA (US)

(72) Inventors: Arvind Jain, Los Altos, CA (US); Soham Mazumdar, San Francisco, CA (US); Fabiano Botelho, San Ramon, CA (US)

(73) Assignee: RUBRIK, INC., Palo Alto, CA (US)

( * ) Notice: Subject to any disclaimer, the term of this patent is extended or adjusted under 35 U.S.C. 154(b) by 286 days.

This patent is subject to a terminal disclaimer.

(21) Appl. No.: 15/804,382

(22) Filed: Nov. 6, 2017

(65) Prior Publication Data
US 2018/0059973 A1 Mar. 1, 2018

Related U.S. Application Data

(63) Continuation of application No. 14/628,001, filed on Feb. 20, 2015, now Pat. No. 10,241,691.

(Continued)

(51) Int. Cl.
*G06F 16/00* (2019.01)
*G06F 3/06* (2006.01)
(Continued)

(52) U.S. Cl.
CPC .......... *G06F 3/0619* (2013.01); *G06F 3/065* (2013.01); *G06F 3/067* (2013.01); *G06F 3/0641* (2013.01); *G06F 3/0665* (2013.01); *G06F 3/0685* (2013.01); *G06F 9/45558* (2013.01); *G06F 9/5077* (2013.01); *G06F 11/1435* (2013.01); *G06F 11/1446* (2013.01);
(Continued)

(58) Field of Classification Search
None
See application file for complete search history.

(56) References Cited

U.S. PATENT DOCUMENTS 8,315,985 B1 11/2012 Ohr
8,332,689 B2 12/2012 Timashev
(Continued)

OTHER PUBLICATIONS

Office Action dated May 26, 2016, U.S. Appl. No. 14/628,022, filed Feb. 20, 2015.

(Continued)

*Primary Examiner* — Bai D Vu
(74) *Attorney, Agent, or Firm* — Schwegman Lundberg & Woessner, P.A.

(57) ABSTRACT

Methods and systems for managing, storing, and serving data within a virtualized environment are described. In some embodiments, a data management system may manage the extraction and storage of virtual machine snapshots, provide near instantaneous restoration of a virtual machine or one or more files located on the virtual machine, and enable secondary workloads to directly use the data management system as a primary storage target to read or modify past versions of data. The data management system may allow a virtual machine snapshot of a virtual machine stored within the system to be directly mounted to enable substantially instantaneous virtual machine recovery of the virtual machine.

20 Claims, 22 Drawing Sheets

Related U.S. Application Data

(60) Provisional application No. 62/075,112, filed on Nov. 4, 2014.

(51) Int. Cl.

| | | |
|---|---|---|
| *G06F 16/13* | (2019.01) | |
| *G06F 16/27* | (2019.01) | |
| *G06F 16/84* | (2019.01) | |
| *G06F 16/11* | (2019.01) | |
| *G06F 16/14* | (2019.01) | |
| *G06F 11/14* | (2006.01) | |
| *H04L 9/32* | (2006.01) | |
| *G06F 9/455* | (2018.01) | |
| *G06F 9/50* | (2006.01) | |
| *H04L 12/26* | (2006.01) | |
| *H04L 29/12* | (2006.01) | |
| *H04L 29/08* | (2006.01) | |
| *G06F 11/20* | (2006.01) | |

(52) U.S. Cl.
CPC ...... *G06F 11/1448* (2013.01); *G06F 11/1451* (2013.01); *G06F 11/1458* (2013.01); *G06F 16/113* (2019.01); *G06F 16/128* (2019.01); *G06F 16/13* (2019.01); *G06F 16/148* (2019.01); *G06F 16/27* (2019.01); *G06F 16/84* (2019.01); *H04L 9/3242* (2013.01); *H04L 9/3247* (2013.01); *H04L 43/0817* (2013.01); *H04L 61/2007* (2013.01); *H04L 61/2061* (2013.01); *H04L 67/10* (2013.01); *G06F 11/1453* (2013.01); *G06F 11/1461* (2013.01); *G06F 11/1464* (2013.01); *G06F 11/1484* (2013.01); *G06F 11/202* (2013.01); *G06F 2009/4557* (2013.01); *G06F 2009/45562* (2013.01); *G06F 2009/45579* (2013.01); *G06F 2009/45583* (2013.01); *G06F 2201/80* (2013.01); *G06F 2201/815* (2013.01); *G06F 2201/84* (2013.01)

(56) References Cited

U.S. PATENT DOCUMENTS

| | | | |
|---|---|---|---|
| 8,341,365 | B2 | 12/2012 | Murase et al. |
| 8,402,309 | B2 | 3/2013 | Timashev |
| 8,589,350 | B1 | 11/2013 | Lalonde |
| 8,645,950 | B2 | 2/2014 | Fries et al. |
| 9,521,198 | B1 | 12/2016 | Agarwala et al. |
| 10,241,691 | B2 | 3/2019 | Jain et al. |
| 2007/0156794 | A1 | 7/2007 | Kisley et al. |
| 2008/0013830 | A1 | 1/2008 | Patterson |
| 2008/0256311 | A1 | 10/2008 | Lee |
| 2010/0049929 | A1* | 2/2010 | Nagarkar ............ G06F 9/45533 711/162 |
| 2010/0077165 | A1 | 3/2010 | Lu |
| 2010/0138827 | A1 | 6/2010 | Frank |
| 2010/0223428 | A1 | 9/2010 | Wayda et al. |
| 2011/0191559 | A1* | 8/2011 | Li ............ G06F 12/16 711/162 |
| 2011/0265085 | A1 | 10/2011 | Kedem |
| 2012/0072393 | A1 | 3/2012 | Kumar |
| 2012/0130956 | A1 | 5/2012 | Caputo |
| 2012/0191931 | A1 | 7/2012 | Bricker |
| 2012/0246645 | A1 | 9/2012 | Iikura et al. |
| 2012/0254131 | A1 | 10/2012 | Al Kiswany |
| 2012/0324446 | A1 | 12/2012 | Fries |
| 2013/0080397 | A1 | 3/2013 | Payne |
| 2013/0145105 | A1 | 6/2013 | Sawicki |
| 2013/0262387 | A1 | 10/2013 | Varadharajan et al. |
| 2014/0047268 | A1 | 2/2014 | Timashev |
| 2014/0052698 | A1 | 2/2014 | Chen |
| 2014/0188807 | A1 | 7/2014 | Ai-Kiswany |
| 2014/0229440 | A1 | 8/2014 | Venkatesh |
| 2014/0244935 | A1 | 8/2014 | Ezra et al. |
| 2014/0297603 | A1 | 10/2014 | Kim |
| 2015/0067283 | A1 | 3/2015 | Basu |
| 2016/0124977 | A1 | 5/2016 | Jain et al. |
| 2019/0171374 | A1 | 6/2019 | Jain et al. |

OTHER PUBLICATIONS

Response to Office Action dated Aug. 26, 2016, U.S. Appl. No. 14/628,022, filed Feb. 20, 2015.

Notice of Allowance dated Oct. 3, 2016, U.S. Appl. No. 14/628,022, filed Feb. 20, 2015.

"U.S. Appl. No. 14/628,001, Non Final Office Action dated Jun. 1, 2017", 22 pages.

"U.S. Appl. No. 14/628,001, Examiner Interview Summary dated Aug. 22, 2017", 3 pages.

"U.S. Appl. No. 14/628,001, Response filed Sep. 1, 2017 to Non Final Office Action dated Jun. 1, 2017", 14 pages.

"U.S. Appl. No. 14/628,001, Final Office Action dated Nov. 16, 2017", 25 pages.

"U.S. Appl. No. 14/628,001, Examiner Interview Summary dated Mar. 21, 2018", 3 pages.

"U.S. Appl. No. 14/628,001, Response filed Apr. 16, 2018 to Final Office Action dated Nov. 16, 2017", 13 pages.

"U.S. Appl. No. 14/628,001, Non Final Office Action dated May 15, 2018", 9 pages.

"U.S. Appl. No. 14/628,001, Examiner Interview Summary dated Aug. 10, 2018", 3 pages.

"U.S. Appl. No. 14/628,001, Response filed Aug. 15, 2018 to Non Final Office Action dated May 15, 2018", 12 pages.

"U.S. Appl. No. 14/628,001, Notice of Allowance dated Nov. 15, 2018", 8 pages.

* cited by examiner

```
Virtual Machine A, Version V7 {
    pBase,        ⟶  /snapshots/VM_A/s5/s5.full
    pF1,          ⟶  /snapshots/VM_A/s6/s6.delta
    pF2           ⟶  /snapshots/VM_A/s7/s7.delta
}
```

```
Virtual Machine A, Version V2 {
    pBase,        ⟶  /snapshots/VM_A/s5/s5.full
    pR1,          ⟶  /snapshots/VM_A/s4/s4.delta
    pR2,          ⟶  /snapshots/VM_A/s3/s3.delta
    pR3           ⟶  /snapshots/VM_A/s2/s2.delta
}
```

Virtual Machine A, Version V7 {
    pBase2,         ⟶ /snapshots/VM_A/s7/s7.full
}

Virtual Machine A, Version V2 {
    pBase2,         ⟶ /snapshots/VM_A/s7/s7.full
    pR11,           ⟶ /snapshots/VM_A/s6/s6.delta
    pR12,           ⟶ /snapshots/VM_A/s5/s5.delta
    pR1,            ⟶ /snapshots/VM_A/s4/s4.delta
    pR2,            ⟶ /snapshots/VM_A/s3/s3.delta
    pR3             ⟶ /snapshots/VM_A/s2/s2.delta
}

```
Virtual Machine B, Version V1 {
    pBase,
    pR1,
    pR2,
    pF3
}
```

```
Virtual Machine C, Version V2 {
    pBase,
    pF1,
    pF5,
    pF6
}
```

Virtual Machine B, Version V1 {
    pBase2,
    pR11,
    pR12,
    pR1,
    pR2,
    pF3
}

Virtual Machine C, Version V2 {
    pBase2,
    pR11,
    pF5,
    pF6
}

Versions of File X on Virtual Machine A

Version X1 of File X saved at Time T1 ⟶ Version A23 of Virtual Machine A
Version X2 of File X saved at Time T2 ⟶ Version A45 of Virtual Machine A
Version X3 of File X saved at Time T3 ⟶ Version A58 of Virtual Machine A
Version X4 of File X saved at Time T4 ⟶ Version A72 of Virtual Machine A Versions of File Y on Virtual Machine A Version Y1 of File Y saved at Time T2 ⟶ Version A45 of Virtual Machine A
Version Y2 of File Y saved at Time T8 ⟶ Version A95 of Virtual Machine A

FIG. 5A

```
Virtual Machine A, Version A45 {
    pBase,           ⟶  /snapshots/VM_A/s100/s100.full
    pR1,             ⟶  /snapshots/VM_A/s99/s99.delta
    pR2,             ⟶  /snapshots/VM_A/s98/s98.delta
      ⋮
    pR54,            ⟶  /snapshots/VM_A/s46/s46.delta
    pR55             ⟶  /snapshots/VM_A/s45/s45.delta
}
```

FIG. 5B

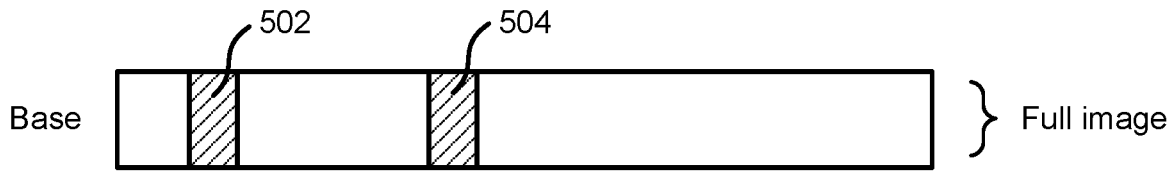

FIG. 5C

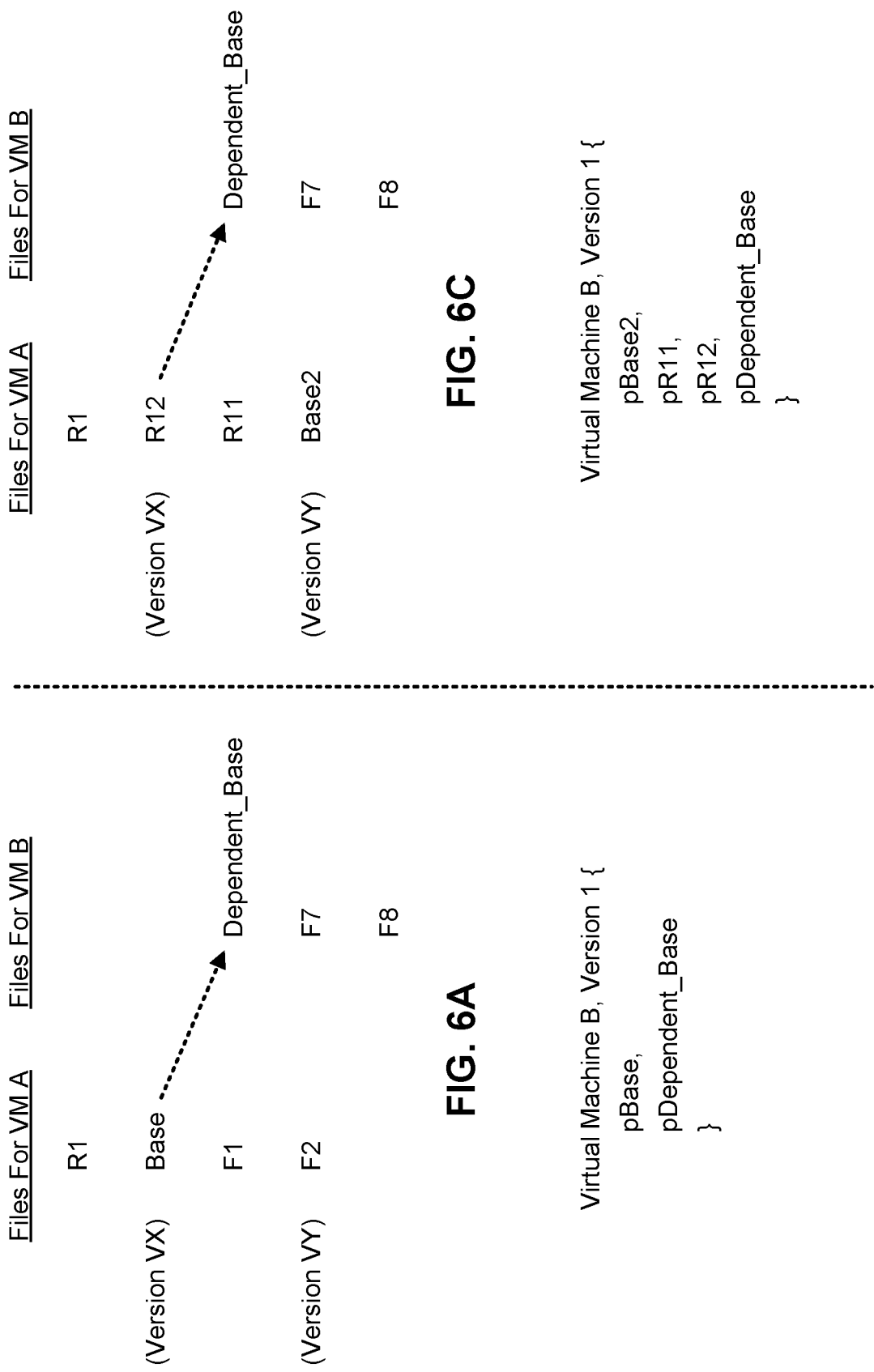

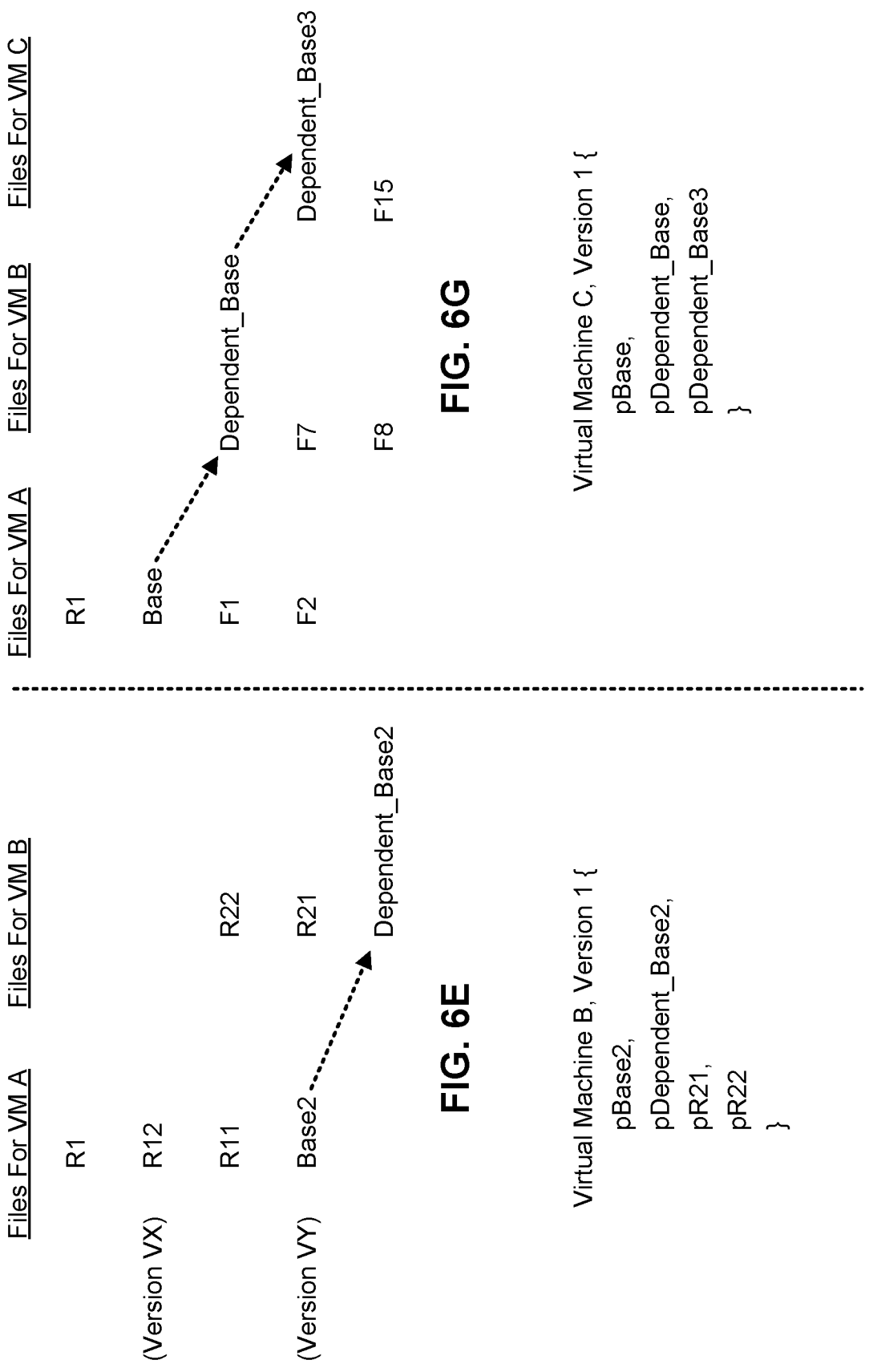

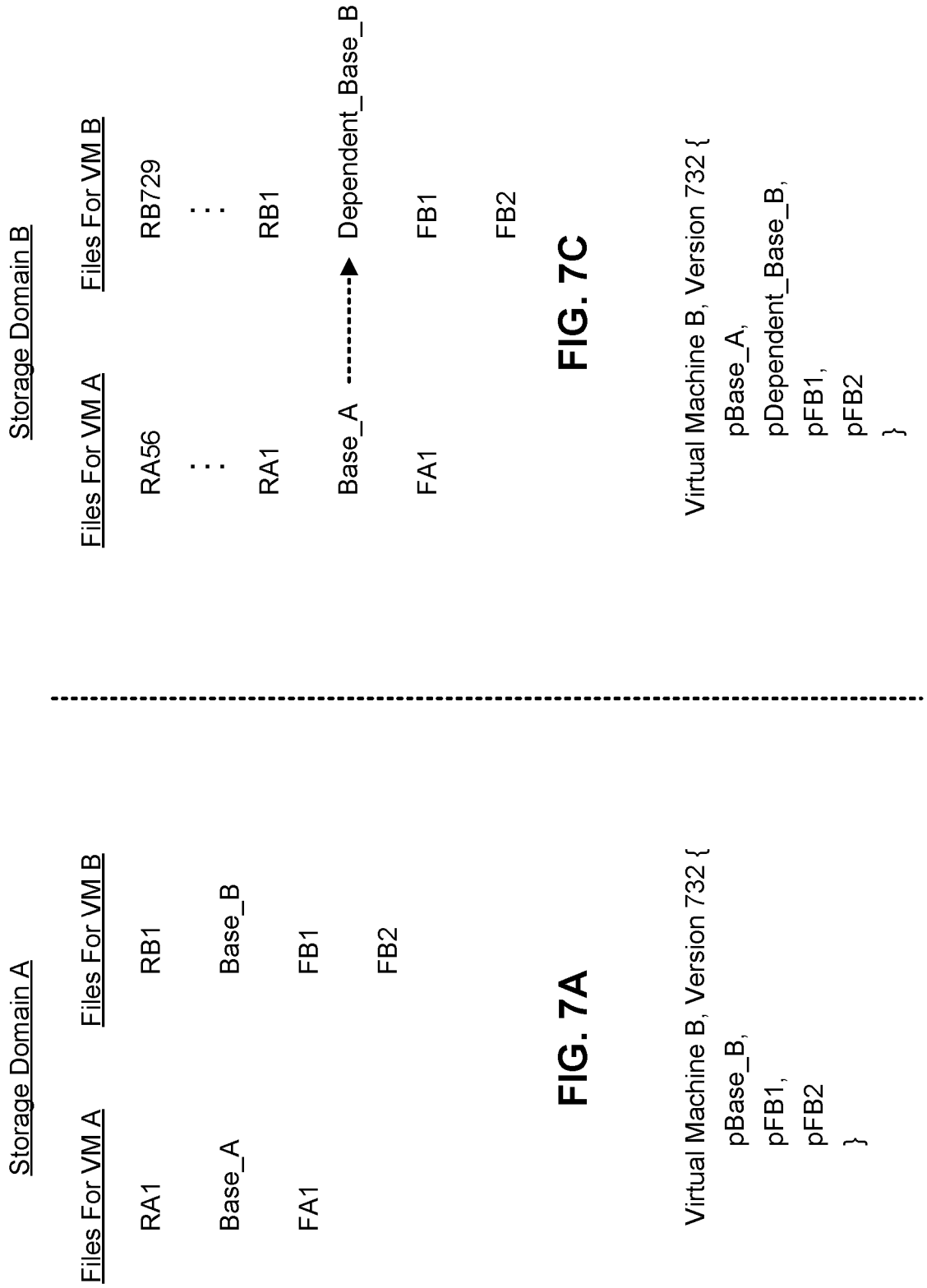

US 10,678,448 B2

DEDUPLICATION OF VIRTUAL MACHINE CONTENT

CLAIM OF PRIORITY

The present application claims priority to U.S. patent application Ser. No. 14/628,001, entitled "Data Management System," filed Feb. 20, 2015, which claims priority to U.S. Provisional Application No. 62/075,112, entitled "Data Management System," filed Nov. 4, 2014, both of which are herein incorporated by reference in their entirety.

BACKGROUND

Virtualization allows virtual hardware to be created and decoupled from the underlying physical hardware. For example, a hypervisor running on a host machine or server may be used to create one or more virtual machines that may each run the same operating system or different operating systems (e.g., a first virtual machine may run a Windows® operating system and a second virtual machine may run a Unix-like operating system such as OS X®). A virtual machine may comprise a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications used by the virtual machine may be stored using the virtual disk. The virtual machine may be stored as a set of files including a virtual disk file for storing the contents of a virtual disk and a virtual machine configuration file for storing configuration settings for the virtual machine. The configuration settings may include the number of virtual processors (e.g., four virtual CPUs), the size of a virtual memory, and the size of a virtual disk (e.g., a 10 GB virtual disk) for the virtual machine.

BRIEF DESCRIPTION OF THE DRAWINGS

FIG. 5A depicts one embodiment of a virtual machine search index.

FIG. 5B depicts one embodiment of a merged file for the version A45 of Virtual Machine A referred to in FIG. 5A.

FIG. 5C depicts one embodiment of a first portion of a base image and a second portion of the base image.

FIGS. 6A-6H depict various embodiments of sets of files and data structures associated with managing and storing snapshots of virtual machines.

FIGS. 7A-7D depict various embodiments of sets of files and data structures associated with managing and storing snapshots of virtual machines.

DETAILED DESCRIPTION

Technology is described for managing, storing, and serving data within a virtualized environment. In one embodiment, an integrated data management and storage system may manage the extraction and storage of historical snapshots associated with different point in time versions of one or more virtual machines, provide near instantaneous restoration of a virtual machine or one or more files located on the virtual machine, and enable secondary workloads (e.g., workloads for experimental or analytics purposes) to directly use the integrated data management and storage system as a primary storage target to read or modify past versions of data. The integrated data management and storage system may provide a unified primary and secondary storage system with built-in data management that allows virtual machine snapshots of a virtual machine stored within the system to be directly mounted or made accessible in order to enable substantially instantaneous virtual machine recovery of the virtual machine. In some cases, the integrated data management and storage system may be used as both a backup storage system and a "live" primary storage system for primary workloads.

As virtualization technologies are adopted into information technology (IT) infrastructures, there is a growing need for recovery mechanisms to support mission critical application deployment within a virtualized infrastructure. However, a virtualized infrastructure may present a new set of challenges to the traditional methods of data management due to the higher workload consolidation and the need for instant, granular recovery. An integrated data management and storage system may enable substantially instantaneous recovery of applications running on the virtual infrastructure without requiring the applications to be restored first to a primary storage platform. The integrated data management and storage system may provide a unified primary and secondary storage system that allows virtual machine snapshots to be directly mounted and used by secondary workloads, thereby providing a non-passive data storage for backups and supporting secondary workloads that require access to production data stored on a primary storage platform used within a production environment. The benefits of using an integrated data management and storage system include the ability to reduce the amount of data storage required to backup virtual machines, the ability to reduce the amount of data storage required to support secondary workloads, the ability to provide a non-passive storage target in which backup data may be directly accessed and modified, and the ability to quickly restore earlier versions of virtual machines and files.

Figure 1A:
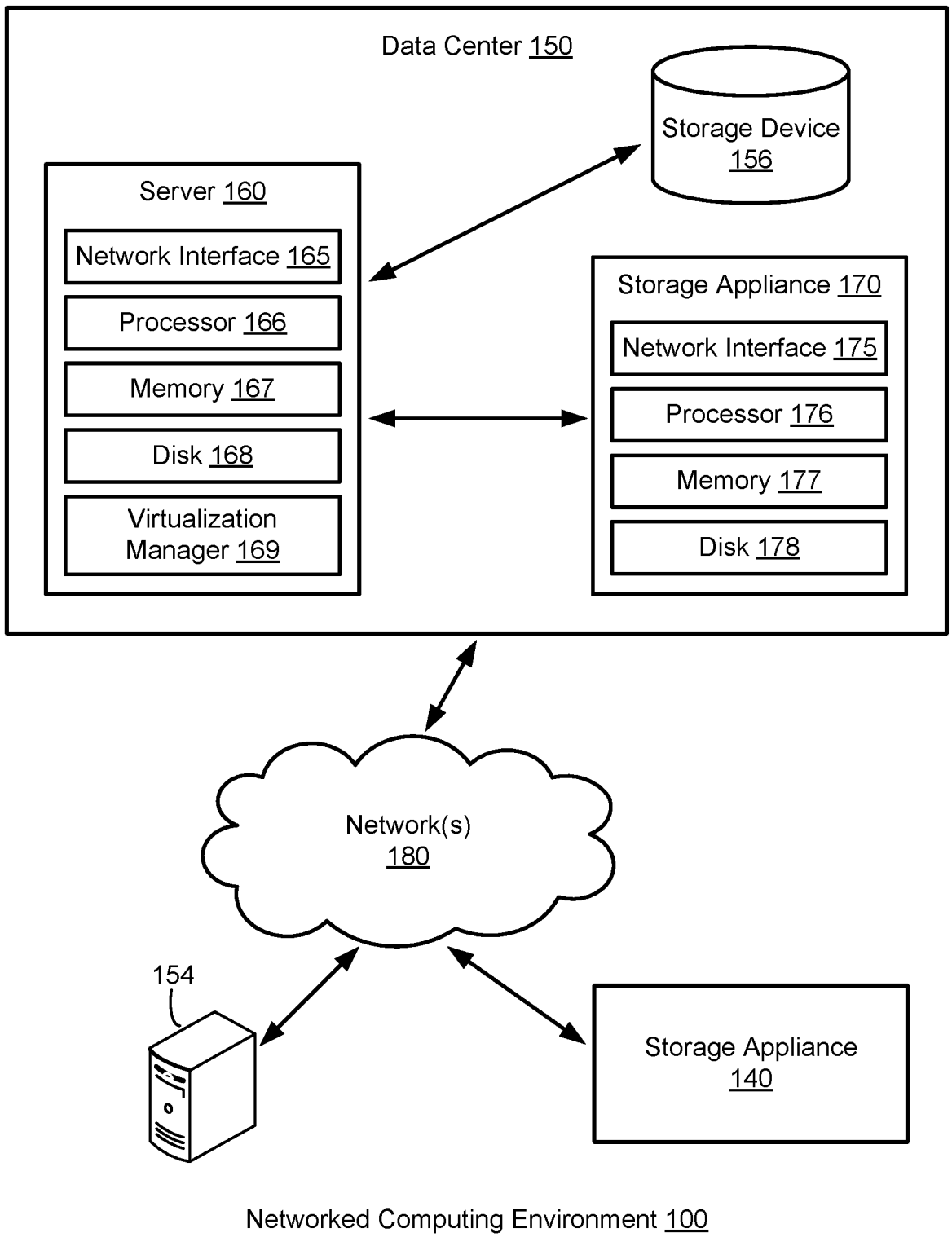
FIG. 1A depicts one embodiment of a networked computing environment.

FIG. 1A depicts one embodiment of a networked computing environment 100 in which the disclosed technology may be practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The storage appliance 170 may include a data management system for backing up virtual machines and/or files within a virtualized infrastructure. The server 160 may be used to create and manage one or more virtual machines associated with a virtualized infrastructure. The one or more virtual machines may run various applications, such as a database application or a web server. The storage device 156 may include one or more hardware storage devices for storing data, such as a hard disk drive (HDD), a magnetic tape drive, a solid-state drive (SSD), a storage area network (SAN) storage device, or a networked-attached storage (NAS) device. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 180 may include a secure network such as an enterprise private network, an unsecure network such as a wireless open network, a local area network (LAN), a wide area network (WAN), and the Internet. The one or more networks 180 may include a cellular network, a mobile network, a wireless network, or a wired network. Each network of the one or more networks 180 may include hubs, bridges, routers, switches, and wired transmission media such as a direct-wired connection. The one or more networks 180 may include an extranet or other private network for securely sharing information or providing controlled access to applications or files.

A server, such as server 160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients.

One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. The virtualization manager 169 may manage the provisioning of virtual machines running within the virtualized infrastructure and provide an interface to computing devices interacting with the virtualized infrastructure. In one example, the virtualization manager 169 may set a virtual machine into a frozen state in response to a snapshot request made via an application programming interface (API) by a storage appliance, such as storage appliance 170. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk file associated with the state of the virtual disk at the point in time is frozen. The virtual disk file may be set into a read-only state to prevent modifications to the virtual disk file while the virtual machine is in the frozen state. The virtualization manager 169 may then transfer data associated with the virtual machine (e.g., an image of the virtual machine or a portion of the image of the virtual machine) to a storage appliance in response to a request made by the storage appliance. After the data associated with the point in time snapshot of the virtual machine has been transferred to the storage appliance, the virtual machine may be released from the frozen state (i.e., unfrozen) and the updates made to the virtual machine and stored in the separate file may be merged into the virtual disk file. The virtualization manager 169 may perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of 1000 virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment. In one example, networked computing environment 100 may provide cloud-based work productivity or business related applications to a computing device, such as computing device 154. The storage appliance 140 may comprise a cloud-based data management system for backing up virtual machines and/or files within a virtualized infrastructure, such as virtual machines running on server 160 or files stored on server 160.

In some cases, networked computing environment 100 may provide remote access to secure applications and files stored within data center 150 from a remote computing device, such as computing device 154. The data center 150 may use an access control application to manage remote access to protected resources, such as protected applications, databases, or files located within the data center. To facilitate remote access to secure applications and files, a secure network connection may be established using a virtual private network (VPN). A VPN connection may allow a remote computing device, such as computing device 154, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5/Version23). In one example, the storage appliance 170 may run an NFS server and make the particular version (or a copy of the particular version) of the virtual machine accessible for reading and/or writing. The end user of the storage appliance 170 may then select the particular version to be mounted and run an application (e.g., a data analytics application) using the mounted version of the virtual machine. In another example, the particular version may be mounted as an iSCSI target.

Figure 1B:
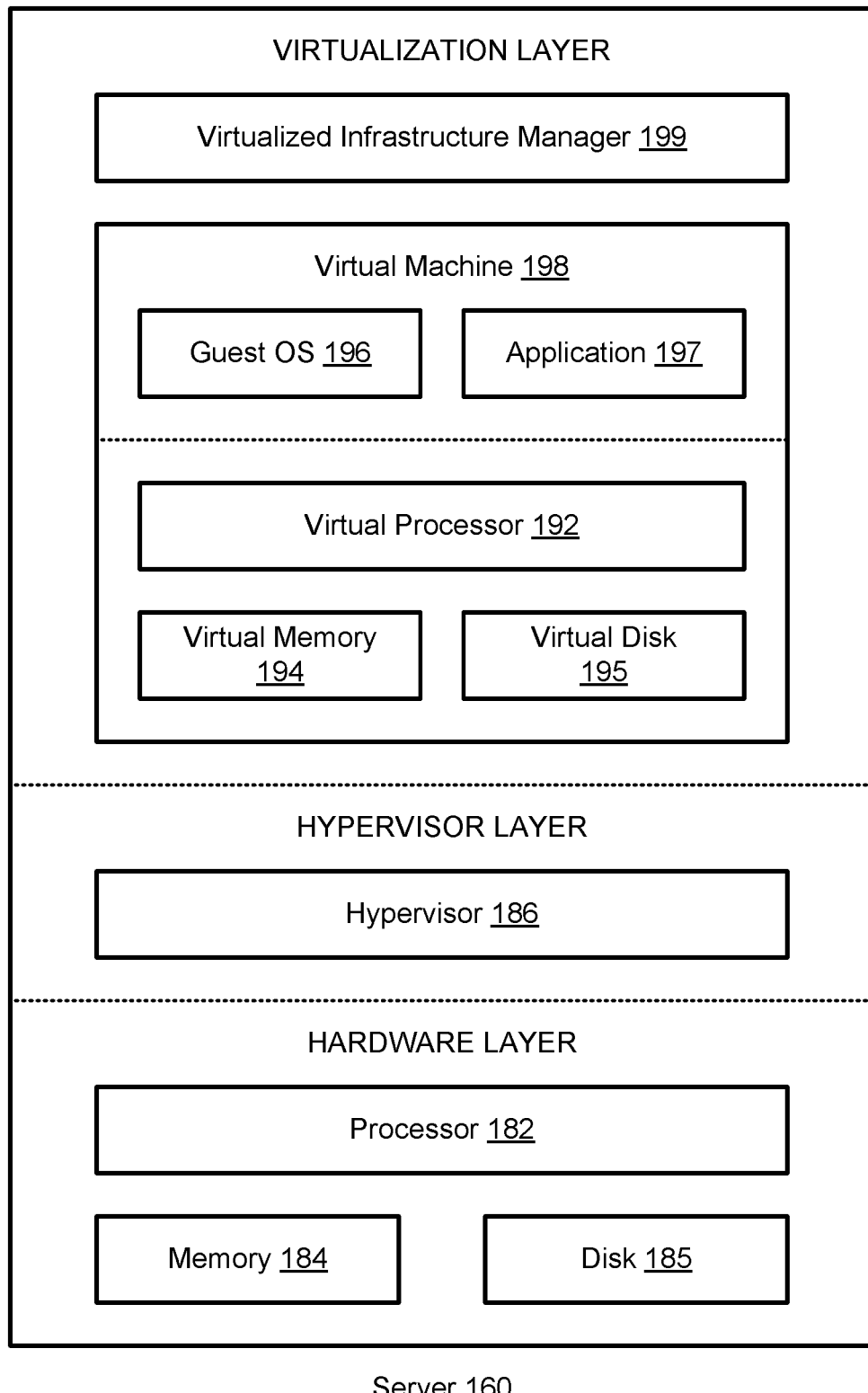
FIG. 1B depicts one embodiment of a server.

FIG. 1B depicts one embodiment of server 160 in FIG. 1A. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197.

The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines. The virtualized infrastructure manager 199 may manage the provisioning of virtual machines running within the virtualized infrastructure and provide an interface to computing devices interacting with the virtualized infrastructure. The virtualized infrastructure manager 199 may perform various virtualized infrastructure related tasks, such as cloning virtual machines, creating new virtual machines, monitoring the state of virtual machines, and facilitating backups of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time (e.g., 5:30 p.m. on Jun. 29, 2014) and a second snapshot of the virtual machine may correspond with a second state of the virtual machine at a second point in time subsequent to the first point in time (e.g., 5:30 p.m. on Jun. 30, 2014).

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 199 may output one or more virtual data blocks associated with the virtual machine that have been modified between the first point in time and the second point in time.

In some embodiments, the server 160 may or the hypervisor 186 may communicate with a storage appliance, such as storage appliance 140 in FIG. 1A or storage appliance 170 in FIG. 1A, using a distributed file system protocol such as Network File System (NFS) Version 3. The distributed file system protocol may allow the server 160 or the hypervisor 186 to access, read, write, or modify files stored on the storage appliance as if the files were locally stored on the server. The distributed file system protocol may allow the server 160 or the hypervisor 186 to mount a directory or a portion of a file system located within the storage appliance.

Figure 1C:
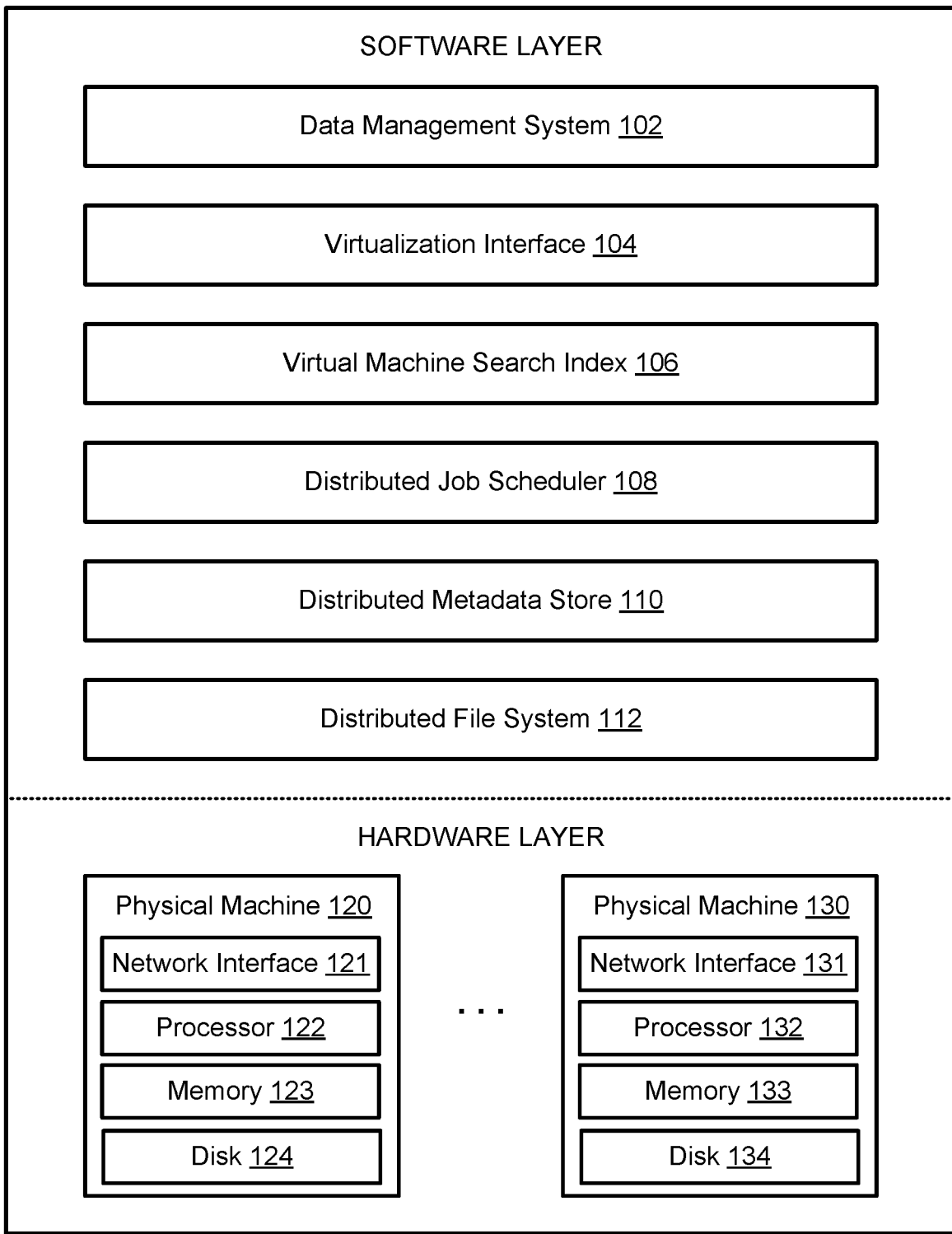
FIG. 1C depicts one embodiment of a storage appliance.

FIG. 1C depicts one embodiment of storage appliance 170 in FIG. 1A. The storage appliance may include a plurality of physical machines that may be grouped together and presented as a single computing system. Each physical machine of the plurality of physical machines may comprise a node in a cluster (e.g., a failover cluster). In one example, the storage appliance may be positioned within a server rack within a data center. As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

In some embodiments, the plurality of physical machines may be used to implement a cluster-based network file server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 160 in FIG. 1A, or a hypervisor, such as hypervisor 186 in FIG. 1B, to communicate with the storage appliance 170 may not provide a failover mechanism (e.g., NFS Version 3). In the case that no failover mechanism is provided on the client-side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 186 in FIG. 1B may be configured with a first floating IP address associated with a first node in the cluster. The hypervisor may connect to the cluster using the first floating IP address. In one example, the hypervisor may communicate with the cluster using the NFS Version 3 protocol. Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of node(j) may be (j−i) modulo N. In another example, given a number (N) of nodes in a cluster from node(0) to node(N−1), for a floating IP address (i), the VRRP priority of node(j) may be (i−j) modulo N. In these cases, node(j) will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 1C, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks. Each of the one or more chunks may be stored within the distributed file system 112 as a separate file. The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 110 may include a distributed database management system that provides high availability without a single point of failure. In one embodiment, the distributed metadata store 110 may comprise a database, such as a distributed document oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals.

The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 108 may schedule a specific job to be run on a particular node based on data stored on the particular node. For example, the distributed job scheduler 108 may schedule a virtual machine snapshot job to be run on a node in a cluster that is used to store snapshots of the virtual machine in order to reduce network congestion.

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster. In one example, the distributed job scheduler 108 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 110. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within 3 minutes from being started). In response to detecting jobs that have failed to be updated within the threshold period of time, the distributed job scheduler 108 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 108 may ensure that each task of the series of tasks is executed based on the ordering of tasks. Tasks that do not have dependencies with each other may be executed in parallel.

In some cases, the distributed job scheduler 108 may schedule each task of a series of tasks to be performed on a specific node in a cluster. In other cases, the distributed job scheduler 108 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster. In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 108 may assign one or more tasks associated with a job to be executed on a particular node in a cluster based on the location of data required to be accessed by the one or more tasks.

In one embodiment, the distributed job scheduler 108 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 199 in FIG. 1B, to create a frozen copy of the virtual machine and to transfer one or more chunks (or one or more files) associated with the frozen copy to a storage appliance, such as storage appliance 170 in FIG. 1A. The one or more tasks may also include generating metadata for the one or more chunks, storing the metadata using the distributed metadata store 110, storing the one or more chunks within the distributed file system 112, and communicating with the virtualized infrastructure manager that the virtual machine the frozen copy of the virtual machine may be unfrozen or released for a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2014), and a file path to where the first chunk is stored within the distributed file system 112 (e.g., the first chunk is located at /snapshots/VM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 104 may provide an interface for communicating with a virtualized infrastructure manager managing a virtualization infrastructure, such as virtualized infrastructure manager 199 in FIG. 1B, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine). In this case, storage appliance 170 may request and receive data from a virtualized infrastructure without requiring agent software to be installed or running on virtual machines within the virtualized infrastructure. The virtualization interface 104 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that include the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

In one embodiment, as each snapshot of a virtual machine is ingested each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 112 in FIG. 1C.

The data management system 102 may comprise an application running on the storage appliance that manages and stores one or more snapshots of a virtual machine. In one example, the data management system 102 may comprise a highest level layer in an integrated software stack running on the storage appliance. The integrated software stack may include the data management system 102, the virtualization interface 104, the distributed job scheduler 108, the distributed metadata store 110, and the distributed file system 112. In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

In some cases, the storage appliance 170 may comprise a converged scale-out data management system that includes an integrated software stack that protects application data, enables near instant recovery of applications, and allows derivative workloads (e.g., testing, development, and analytic workloads) to use the storage appliance as a primary storage platform to read and/or modify past versions of data. In one embodiment, the data management system 102 may manage and store a plurality of point in time versions of a virtual machine, receive an instruction to restore a first version of the plurality of point in time versions of the virtual machine (e.g., to restore the virtual machine to a restore point), generate the first version in response to the instruction to restore the first version, and output the first version (e.g., transfer the first version to a primary storage system). The first version may correspond with the most recent snapshot of the virtual machine. The data management system 102 may also receive a second instruction to restore a particular version of a particular file (e.g., a word processing document or a database file), determine a second version of the plurality of point in time versions of the virtual machine that includes the particular version of the particular file, extract the particular version of the particular file from a portion of the second version of the virtual machine (e.g., extracting the particular version of the particular file without completely generating the full image of the second version of the virtual machine), and output the particular version of the particular file (e.g., by transferring the particular version of the particular file to a server). In some cases, a group of one or more files (e.g., associated with a file folder) may be restored and outputted from the storage appliance 170 without requiring a full image of a virtual machine to be generated or restored.

In another embodiment, the data management system 102 may manage and store a plurality of point in time versions of a virtual machine, receive an instruction to mount a particular version of the plurality of point in time versions, generate a mounted version of the virtual machine based on the particular version in response to the instruction to mount the particular version, output a first set of data associated with the mounted version, receive a second set of data associated with one or more modifications to the mounted version, and update the mounted version of the virtual machine based on the second set of data. In parallel, while a primary system has mounted the particular version of the virtual machine and has the ability to access and/or modify data associated with the particular version of the virtual machine, a copy of the particular version of the virtual machine (e.g., the contents of a virtual disk and configuration information associated with the particular version) and any subsequent changes to the particular version of the virtual machine may be transferred to the primary system. In some cases, a primary system may automatically failover or switch to the particular version stored on the storage appliance 170 and then automatically failback or switch back to the primary system once the particular version of the virtual machine has been transferred to the primary system. By allowing a primary system to directly mount the particular version of the virtual machine, the primary system may immediately bring up and use the particular version of the virtual machine without first restoring and transferring the particular version of the virtual machine to the primary system. In some cases, to improve system performance and to enable a non-passive storage system, the data management system 102 may generate and then store the mounted version of the virtual machine in a cache, such as a flash-based cache.

In another embodiment, the data management system 102 may manage and store a plurality of point in time versions of a virtual machine, receive an instruction to generate a derivative version of a first version of the plurality of point in time versions, generate the derivative version in response to the instruction, receive a second set of data associated with one or more modifications to the derivative version, and update the derivative version of the virtual machine based on the second set of data. By allowing a system running a derivative workload to directly mount a derivative version of a point in time version of the virtual machine and read and/or modify data associated with the derivative version, the derivative workload may be run using a backup storage system for a primary system, thereby enabling a non-passive backup system for the primary system. In one example, a new application may be installed on a derivative version of a snapshot of a virtual machine and run using the derivative version in order to test the execution of the new application prior to installing the new application within a production environment.

In some embodiments, a plurality of versions of a virtual machine may be stored as a base file associated with a complete image of the virtual machine at a particular point in time and one or more incremental files associated with forward and/or reverse incremental changes derived from the base file. The data management system 102 may patch together the base file and the one or more incremental files in order to generate a particular version of the plurality of versions by adding and/or subtracting data associated with the one or more incremental files from the base file or intermediary files derived from the base file. In some embodiments, each version of the plurality of versions of a virtual machine may correspond with a merged file. A merged file may include pointers or references to one or more files and/or one or more chunks associated with a particular version of a virtual machine. In one example, a merged file may include a first pointer or symbolic link to a base file and a second pointer or symbolic link to an incremental file associated with the particular version of the virtual machine. In some embodiments, the one or more incremental files may correspond with forward incrementals (e.g., positive deltas), reverse incrementals (e.g., negative deltas), or a combination of both forward incrementals and reverse incrementals.

FIGS. 2A-2L depict various embodiments of sets of files and data structures (e.g., implemented using merged files) associated with managing and storing snapshots of virtual machines. FIGS. 2A-2L may be referred to when describing the processes depicted in FIGS. 3A-3C.

Figures 2A, 2B, 2C:
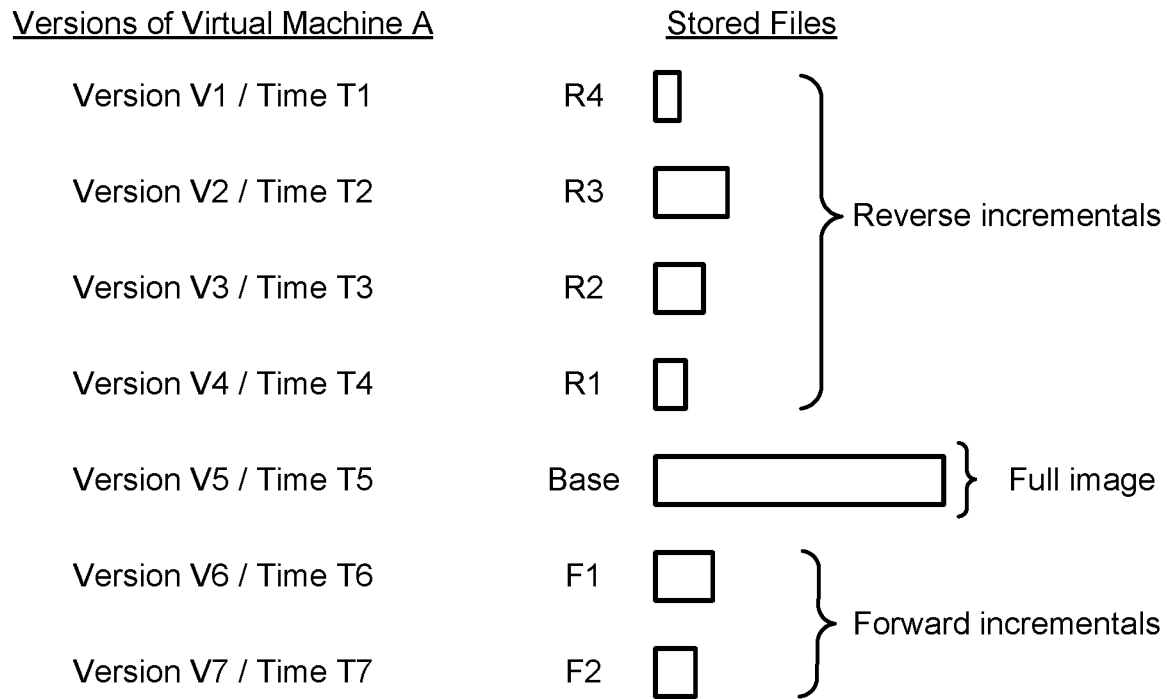
FIGS. 2A-2L depict various embodiments of sets of files and data structures associated with managing and storing snapshots of virtual machines.

FIG. 2A depicts one embodiment of a set of virtual machine snapshots stored as a first set of files. The first set of files may be stored using a distributed file system, such as distributed file system 112 in FIG. 1C. As depicted, the first set of files includes a set of reverse incrementals (R1-R4), a full image (Base), and a set of forward incrementals (F1-F2). The set of virtual machine snapshots includes different versions of a virtual machine (versions V1-V7 of Virtual Machine A) captured at different points in time (times T1-T7). In some cases, the file size of the reverse incremental R3 and the file size of the forward incremental F2 may both be less than the file size of the base image corresponding with version V5 of Virtual Machine A. The base image corresponding with version V5 of Virtual Machine A may comprise a full image of Virtual Machine A at point in time T5. The base image may include a virtual disk file for Virtual Machine A at point in time T5. The reverse incremental R3 corresponds with version V2 of Virtual Machine A and the forward incremental F2 corresponds with version V7 of Virtual Machine A.

In some embodiments, each snapshot of the set of virtual machine snapshots may be stored within a storage appliance, such as storage appliance 170 in FIG. 1A. In other embodiments, a first set of the set of virtual machine snapshots may be stored within a first storage appliance and a second set of the set of virtual machine snapshots may be stored within a second storage appliance, such as storage appliance 140 in FIG. 1A. In this case, a data management system may extend across both the first storage appliance and the second storage appliance. In one example, the first set of the set of virtual machine snapshots may be stored within a local cluster repository (e.g., recent snapshots of the file may be located within a first data center) and the second set of the set of virtual machine snapshots may be stored within a remote cluster repository (e.g., older snapshots or archived snapshots of the file may be located within a second data center) or a cloud repository.

FIG. 2B depicts one embodiment of a merged file for generating version V7 of Virtual Machine A using the first set of files depicted in FIG. 2A. The merged file includes a first pointer (pBase) that references the base image Base (e.g., via the path /snapshots/VM_A/s5/s5.full), a second pointer (pF1) that references the forward incremental F1 (e.g., via the path /snapshots/VM_A/s6/s6.delta), and a third pointer (pF2) that references the forward incremental F2 (e.g., via the path /snapshots/VM_A/s7/s7.delta). In one embodiment, to generate the full image of version V7 of Virtual Machine A, the base image may be acquired, the data changes associated with forward incremental F1 may be applied to (or patched to) the base image to generate an intermediate image, and then the data changes associated with forward incremental F2 may be applied to the intermediate image to generate the full image of version V7 of Virtual Machine A.

FIG. 2C depicts one embodiment of a merged file for generating version V2 of Virtual Machine A using the first set of files depicted in FIG. 2A. The merged file includes a first pointer (pBase) that references the base image Base (e.g., via the path /snapshots/VM_A/s5/s5.full), a second pointer (pR1) that references the reverse incremental R1 (e.g., via the path /snapshots/VM_A/s4/s4.delta), a third pointer (pR2) that references the reverse incremental R2 (e.g., via the path /snapshots/VM_A/s3/s3.delta), and a fourth pointer (pR3) that references the reverse incremental R3 (e.g., via the path /snapshots/VM_A/s2/s2.delta). In one embodiment, to generate the full image of version V2 of Virtual Machine A, the base image may be acquired, the data changes associated with reverse incremental R1 may be applied to the base image to generate a first intermediate image, the data changes associated with reverse incremental R2 may be applied to the first intermediate image to generate a second intermediate image, and then the data changes associated with reverse incremental R3 may be applied to the second intermediate image to generate the full image of version V2 of Virtual Machine A.

Figures 2D, 2E, 2F:
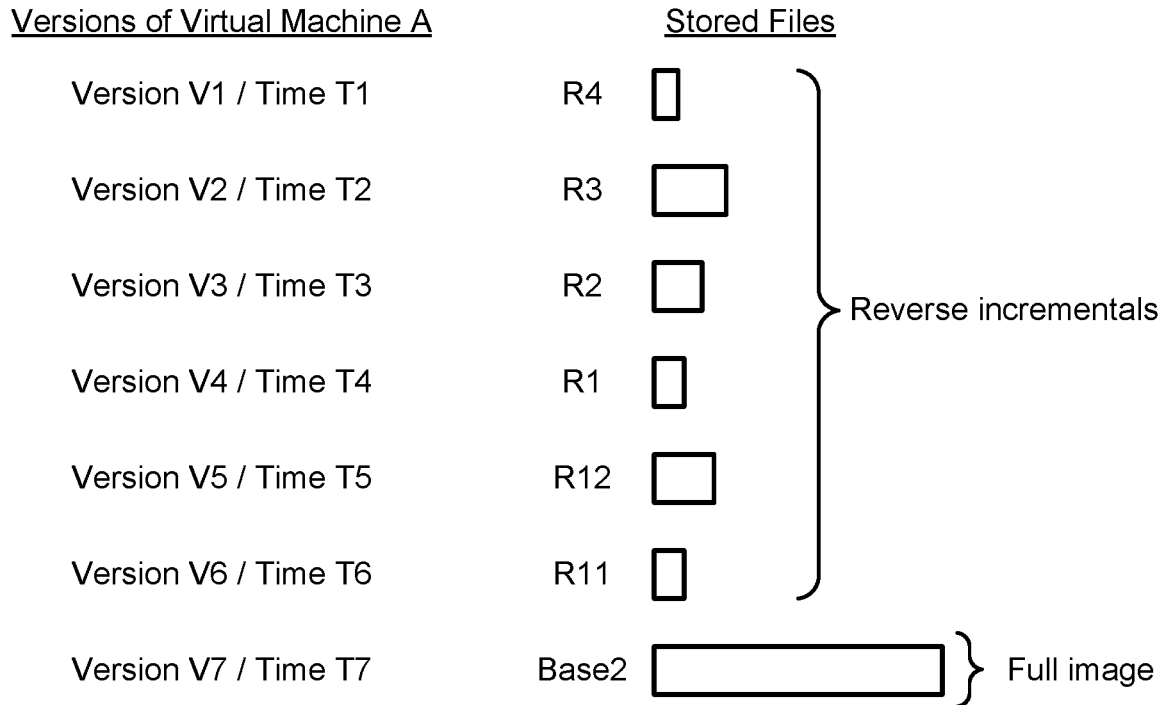

FIG. 2D depicts one embodiment of a set of virtual machine snapshots stored as a second set of files after a consolidation process has been performed using the first set of files in FIG. 2A. The second set of files may be stored using a distributed file system, such as distributed file system 112 in FIG. 1C. The consolidation process may generate new files R12, R11, and Base2 associated with versions V5-V7 of Virtual Machine A in order to move a full image closer to a more recent version of Virtual Machine A and to improve the reconstruction time for the more recent versions of Virtual Machine A. The data associated with the full image Base in FIG. 2A may be equivalent to the new file R12 patched over Ru and the full image Base2. Similarly, the data associated with the full image Base2 may be equivalent to the forward incremental F2 in FIG. 2A patched over F1 and the full image Base in FIG. 2A.

In some cases, the consolidation process may be part of a periodic consolidation process that is applied at a consolidation frequency (e.g., every 24 hours) to each virtual machine of a plurality of protected virtual machines to reduce the number of forward incremental files that need to be patched to a base image in order to restore the most recent version of a virtual machine. Periodically reducing the number of forward incremental files may reduce the time to restore the most recent version of the virtual machine as the number of forward incremental files that need to be applied to a base image to generate the most recent version may be limited. In one example, if a consolidation process is applied to snapshots of a virtual machine every 24 hours and snapshots of the virtual machine are acquired every four hours, then the number of forward incremental files may be limited to at most five forward incremental files.

As depicted, the second set of files includes a set of reverse incrementals (R11-R12 and R1-R4) and a full image (Base2). The set of virtual machine snapshots includes the different versions of the virtual machine (versions V1-V7 of Virtual Machine A) captured at the different points in time (times T1-T7) depicted in FIG. 2A. In some cases, the file size of the reverse incremental R2 may be substantially less than the file size of the base image Base2. The reverse incremental R2 corresponds with version V2 of Virtual Machine A and the base image Base2 corresponds with version V7 of Virtual Machine A. In this case, the most recent version of Virtual Machine A (i.e., the most recent restore point for Virtual Machine A) comprises a full image. To generate earlier versions of Virtual Machine A, reverse incrementals may be applied to (or patched to) the full image Base2. Subsequent versions of Virtual Machine A may be stored as forward incrementals that depend from the full image Base2.

In one embodiment, a consolidation process may be applied to a first set of files associated with a virtual machine in order to generate a second set of files to replace the first set of files. The first set of files may include a first base image from which a first version of the virtual machine may be derived and a first forward incremental file from which a second version of the virtual machine may be derived. The second set of files may include a second reverse incremental file from which the first version of the virtual machine may be derived and a second base image from which the second version of the virtual machine may be derived. During the consolidation process, data integrity checking may be performed to detect and correct data errors in the files stored in a file system, such as distributed file system 112 in FIG. 1C, that are read to generate the second set of files.

FIG. 2E depicts one embodiment of a merged file for generating version V7 of Virtual Machine A using the second set of files depicted in FIG. 2D. The merged file includes a first pointer (pBase2) that references the base image Base2 (e.g., via the path /snapshots/VM_A/s7/s7.full). In this case, the full image of version V7 of Virtual Machine A may be directly acquired without patching forward incrementals or reverse incrementals to the base image Base2 corresponding with version V7 of Virtual Machine A.

FIG. 2F depicts one embodiment of a merged file for generating version V2 of Virtual Machine A using the second set of files depicted in FIG. 2D. The merged file includes a first pointer (pBase2) that references the base image Base2 (e.g., via the path /snapshots/VM_A/s7/s7.full), a second pointer (pR11) that references the reverse incremental R11 (e.g., via the path /snapshots/VM_A/s6/s6.delta), a third pointer (pR12) that references the reverse incremental R12 (e.g., via the path /snapshots/VM_A/s5/s5.delta), a fourth pointer (pR1) that references the reverse incremental R1 (e.g., via the path /snapshots/VM_A/s4/s4.delta), a fifth pointer (pR2) that references the reverse incremental R2 (e.g., via the path /snapshots/VM_A/s3/s3.delta), and a sixth pointer (pR3) that references the reverse incremental R3 (e.g., via the path /snapshots/VM_A/s2/s2.delta). In one embodiment, to generate the full image of version V2 of Virtual Machine A, the base image may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and then the data changes associated with reverse incremental R3 may be applied to the fourth intermediate image to generate the full image of version V2 of Virtual Machine A.

Figures 2G, 2H, 2I:
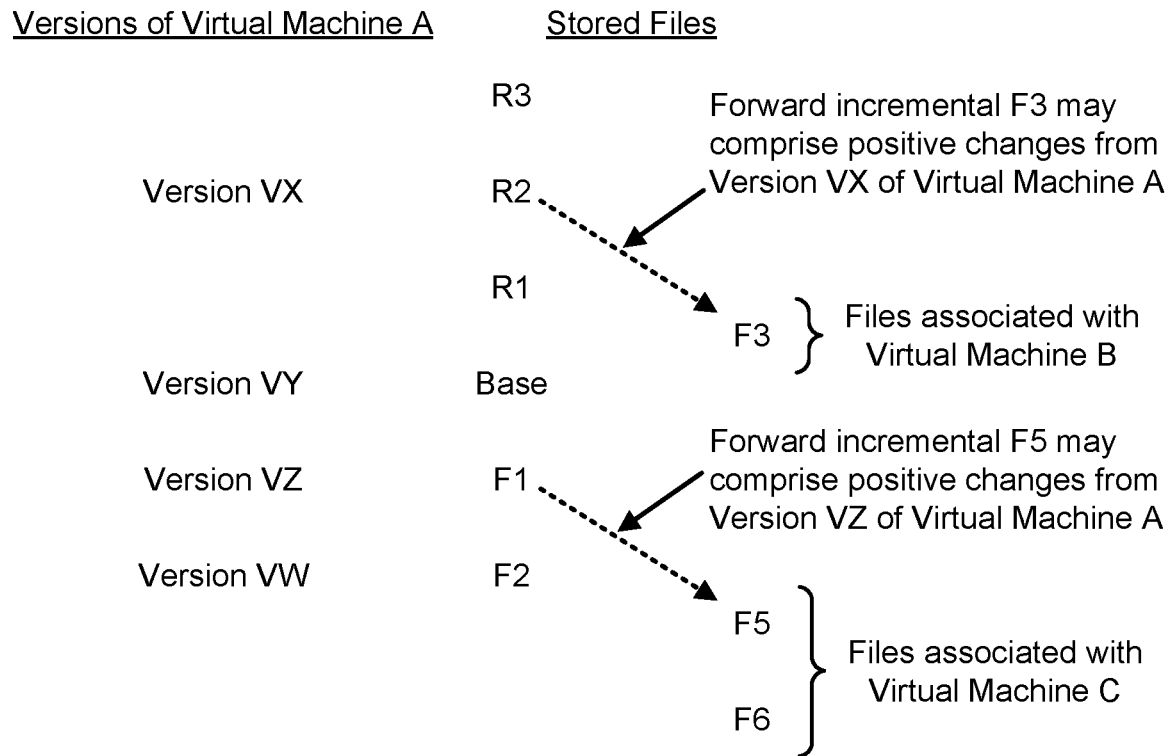

FIG. 2G depicts one embodiment of a set of files associated with multiple virtual machine snapshots. The set of files may be stored using a distributed file system, such as distributed file system 112 in FIG. 1C. As depicted, the set of files includes a set of reverse incrementals (R1-R3), a full image (Base), and a set of forward incrementals (F1-F2, F3, and F5-F6). In this case, a first version of Virtual Machine B may be generated using a forward incremental F3 that derives from Version VX of Virtual Machine A and a second version of Virtual Machine C may be generated using forward incrementals F5-F6 that are derived from Version VZ of Virtual Machine A. In one example, Virtual Machine B may have been initially cloned from Version VX of Virtual Machine A and Virtual Machine C may have been initially cloned from Version VZ of Virtual Machine A.

In one embodiment, in response to a failure of a first virtual machine in a production environment (e.g., due to a failure of a physical machine running the first virtual machine), a most recent snapshot of the first virtual machine stored within a storage appliance, such as storage appliance 170 in FIG. 1C, may be mounted and made available to the production environment. In some cases, the storage appliance may allow the most recent snapshot of the first virtual machine to be mounted by a computing device within the production environment, such as server 160 in FIG. 1A. Once the most recent snapshot of the first virtual machine has been mounted, data stored within the most recent snapshot of the first virtual machine may be read and/or modified and new data may be written without the most recent snapshot of the first virtual machine being fully restored and transferred to the production environment.

In another embodiment, a secondary workload may request that a particular version of a virtual machine be mounted. In response to the request, a storage appliance, such as storage appliance 170 in FIG. 1C, may clone the particular version of the virtual machine to generate a new virtual machine and then make the new virtual machine available to the secondary workload. Once the new virtual machine has been mounted, data stored within the new virtual machine may be read and/or modified and new data may be written to the new virtual machine without changing data associated with the particular version of the virtual machine stored within the storage appliance.

FIG. 2H depicts one embodiment of a merged file for generating version V1 of Virtual Machine B using the set of files depicted in FIG. 2G. The merged file includes a first pointer (pBase) that references the base image Base, a second pointer (pR1) that references the reverse incremental R1, a third pointer (pR2) that references the reverse incremental R2, and a fourth pointer (pF3) that references the forward incremental F3. In one embodiment, to generate the full image of version V1 of Virtual Machine B, the base image associated with Version VY of Virtual Machine A may be acquired, the data changes associated with reverse incremental R1 may be applied to the base image to generate a first intermediate image, the data changes associated with reverse incremental R2 may be applied to the first intermediate image to generate a second intermediate image, and the data changes associated with forward incremental F3 may be applied to the second intermediate image to generate the full image of version V1 of Virtual Machine B.

FIG. 2I depicts one embodiment of a merged file for generating version V2 of Virtual Machine C using the set of files depicted in FIG. 2G. The merged file includes a first pointer (pBase) that references the base image Base, a second pointer (pF1) that references the forward incremental F1, a third pointer (pF5) that references the forward incremental F5, and a fourth pointer (pF6) that references the forward incremental F6. In one embodiment, to generate the full image of version V2 of Virtual Machine C, a base image (e.g., the base image associated with Version VY of Virtual Machine A) may be acquired, the data changes associated with forward incremental F1 may be applied to the base image to generate a first intermediate image, the data changes associated with forward incremental F5 may be applied to the first intermediate image to generate a second intermediate image, and the data changes associated with forward incremental F6 may be applied to the second intermediate image to generate the full image of version V2 of Virtual Machine C.

Figures 2J, 2K, 2L:
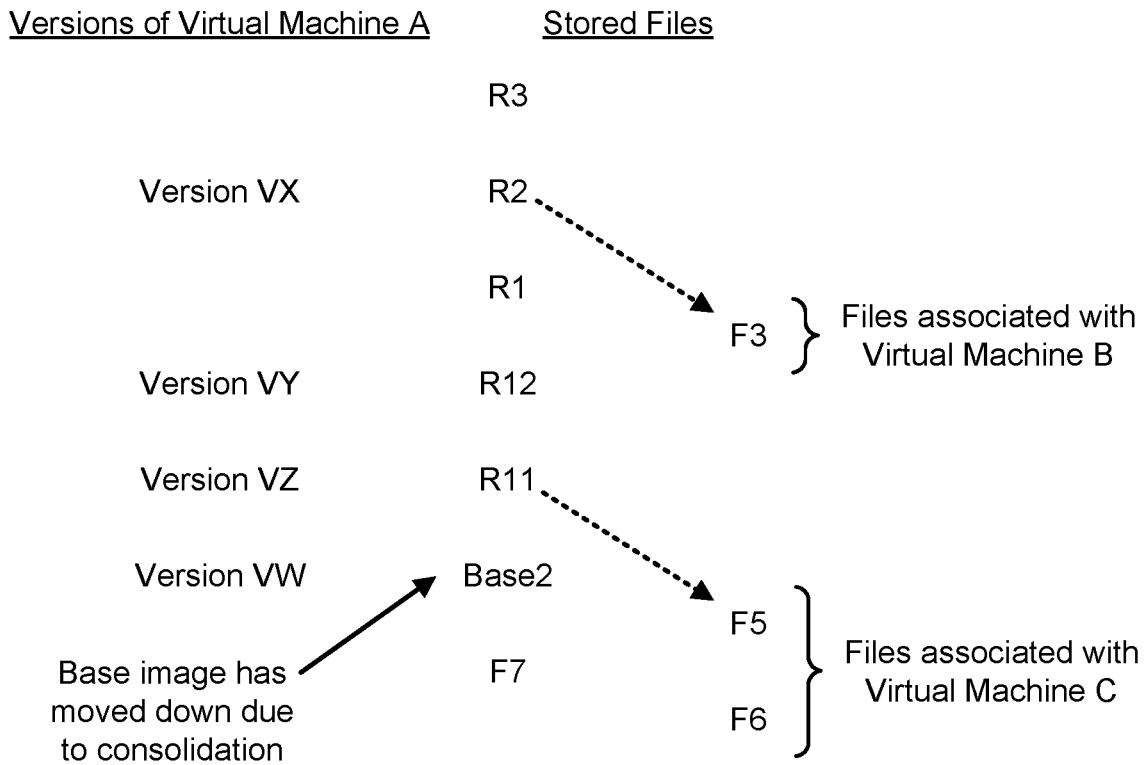

FIG. 2J depicts one embodiment of a set of files associated with multiple virtual machine snapshots after a consolidation process has been performed using the set of files in FIG. 2G. The set of files may be stored using a distributed file system, such as distributed file system 112 in FIG. 1C. The consolidation process may generate new files R12, R11, and Base2. As depicted, the set of files includes a set of reverse incrementals (R11-R12 and R1-R3), a full image (Base2), and a set of forward incrementals (F3 and F5-F7). In this case, a first version of Virtual Machine B may be generated using a forward incremental F3 that derives from Version VX of Virtual Machine A and a second version of Virtual Machine C may be generated using forward incrementals F5-F6 that are derived from Version VZ of Virtual Machine A. In one example, Virtual Machine B may have been initially cloned from Version VX of Virtual Machine A and Virtual Machine C may have been initially cloned from version VZ of Virtual Machine A. Forward incremental file F7 may include changes to Version VW of Virtual Machine A that occurred subsequent to the generation of the full image file Base2. In some cases, the forward incremental file F7 may comprise a writeable file or have file permissions allowing modification of the file, while all other files associated with earlier versions of Virtual Machine A comprise read only files.

FIG. 2K depicts one embodiment of a merged file for generating version V1 of Virtual Machine B using the set of files depicted in FIG. 2J. The merged file includes a first pointer (pBase2) that references the base image Base2, a second pointer (pR11) that references the reverse incremental R11, a third pointer (pR12) that references the reverse incremental R12, a fourth pointer (pR1) that references the reverse incremental R1, a fifth pointer (pR2) that references the reverse incremental R2, and a sixth pointer (pF3) that references the forward incremental F3. In one embodiment, to generate the full image of version V1 of Virtual Machine B, a base image (e.g., the base image associated with Version VW of Virtual Machine A) may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and the data changes associated with forward incremental F3 may be applied to the fourth intermediate image to generate the full image of version V1 of Virtual Machine B.

FIG. 2L depicts one embodiment of a merged file for generating version V2 of Virtual Machine C using the set of files depicted in FIG. 2J. The merged file includes a first pointer (pBase2) that references the base image Base2, a second pointer (pR11) that references the reverse incremental R11, a third pointer (pF5) that references the forward incremental F5, and a fourth pointer (pF6) that references the forward incremental F6. In one embodiment, to generate the full image of version V2 of Virtual Machine C, a base image (e.g., the base image associated with Version VW of Virtual Machine A) may be acquired, the data changes associated with reverse incremental R11 may be applied to the base image to generate a first intermediate image, the data changes associated with forward incremental F5 may be applied to the first intermediate image to generate a second intermediate image, and the data changes associated with forward incremental F6 may be applied to the second intermediate image to generate the full image of version V2 of Virtual Machine C.

In some embodiments, a data storage system may include a distributed scale-out software and storage stack that integrates backup data management software with a storage target. The distributed scale-out software may enable the data storage system to be scalable and run using commodity hardware. The data storage system may be used to backup one or more virtual machines running within a virtualized environment or to backup one or more applications associated with the one or more virtual machines. Via communication with a virtualization manager, such as virtualization manager 169 in FIG. 1A, the data storage system may discover the one or more virtual machines within the virtualized environment and capture snapshots of the one or more virtual machines over time. Each captured snapshot may correspond with a virtual machine level image of a virtual machine.

Figure 3A:
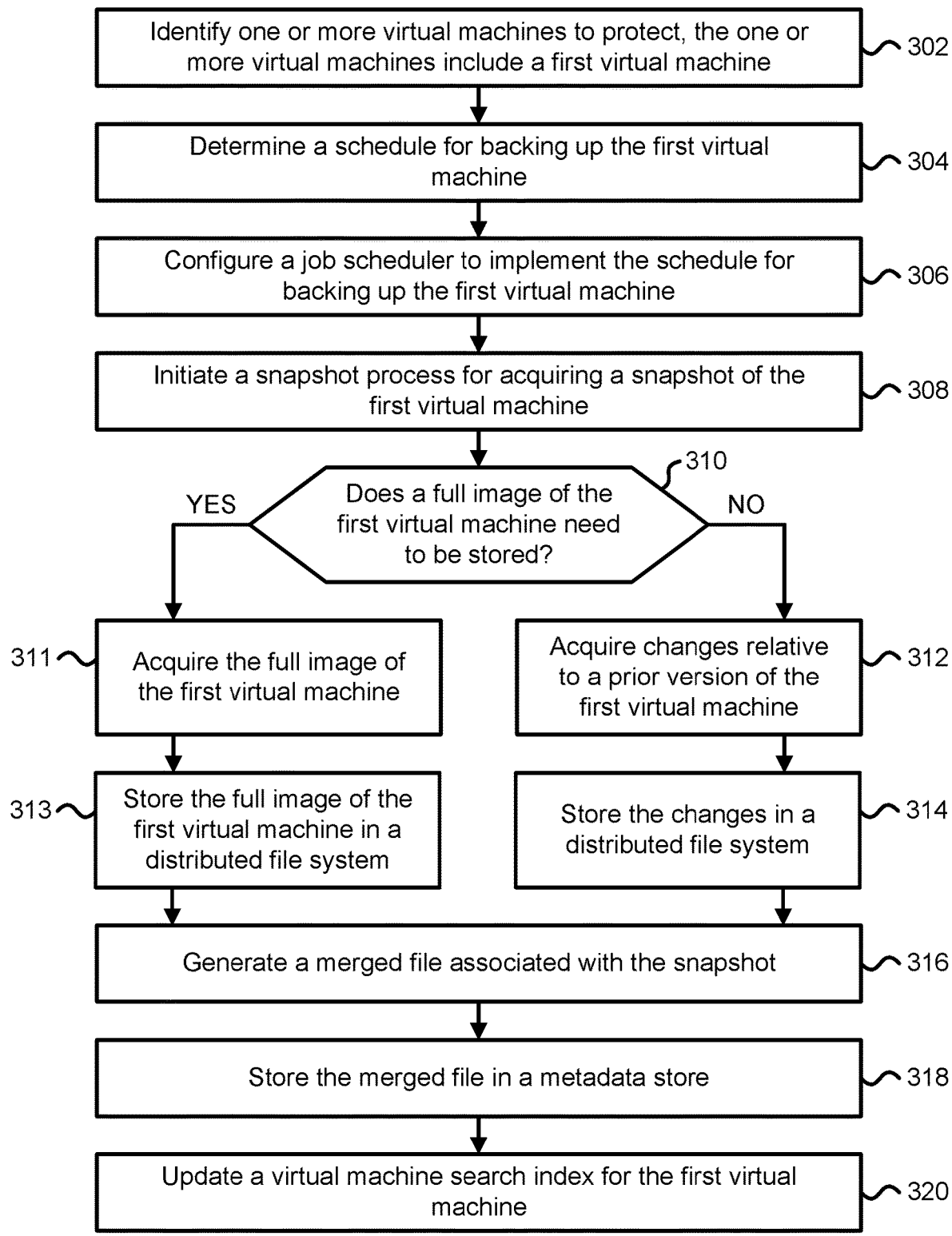
FIG. 3A is a flowchart describing one embodiment of a process for managing and storing virtual machine snapshots using a data storage system.

FIG. 3A is a flowchart describing one embodiment of a process for managing and storing virtual machine snapshots using a data storage system. In one embodiment, the process of FIG. 3A may be performed by a storage appliance, such as storage appliance 170 in FIG. 1A.

In step 302, one or more virtual machines to be protected or backed up are identified. The one or more virtual machines include a first virtual machine. The one or more virtual machines may be selected by an end user of a storage appliance, such as storage appliance 170 in FIG. 1A, using a user interface provided by the storage appliance. In step 304, a schedule for backing up the first virtual machine is determined. In one example, the schedule for backing up the first virtual machine may comprise periodically backing up the first virtual machine every four hours. In step 306, a job scheduler is configured to implement the schedule for backing up the first virtual machine. In one example, a distributed job scheduler, such as distributed job scheduler 108 in FIG. 1C, may be configured to schedule and run processes for capturing and storing images of the first virtual machine over time according the schedule.

In step 308, a snapshot process for acquiring a snapshot of the first virtual machine is initiated. The snapshot process may send an instruction to a virtualized infrastructure manager, such as virtualization manager 169 in FIG. 1A, that requests data associated with the snapshot of the first virtual machine. In step 310, it is determined whether a full image of the first virtual machine needs to be stored in order to store the snapshot of the first virtual machine. The determination of whether a full image is required may depend on whether a previous full image associated with a prior version of the first virtual machine has been acquired. If a full image needs to be stored, then step 311 is performed. Otherwise, if a full image does not need to be stored, then step 312 is performed. In step 311, the full image of the first virtual machine is acquired. The full image of the first virtual machine may correspond with a file or one or more data chunks. In step 312, changes relative to a prior version of the first virtual machine are acquired. The changes relative to the prior version of the first virtual machine may correspond with a file or one or more data chunks. In step 313, the full image of the first virtual machine is stored in a distributed file system, such as distributed file system 112 in FIG. 1C. In step 314, the changes relative to the prior version of the first virtual machine are stored in a distributed file system, such as distributed file system 112 in FIG. 1C. In one embodiment, the full image of the first virtual machine may be stored using a first storage device of a first type (e.g., a HDD) and the changes relative to the prior version of the first virtual machine may be stored using a second storage device of a second type (e.g., an SSD).

In some embodiments, snapshots of the first virtual machine may be ingested at a snapshot capture frequency (e.g., every 30 minutes) by a data storage system. When a snapshot of the first virtual machine is ingested, the snapshot may be compared with other snapshots stored within the data storage system in order to identify a candidate snapshot from which the snapshot may depend. In one example, a scalable approximate matching algorithm may be used to identify the candidate snapshot whose data most closely matches the data associated with the snapshot or to identify the candidate snapshot whose data has the fewest number of data differences with the snapshot. In another example, an approximate matching algorithm may be used to identify the candidate snapshot whose data within a first portion of the candidate snapshot most closely matches data associated with a first portion of the snapshot. In some cases, a majority of the data associated with the snapshot and the candidate snapshot may be identical (e.g., both the snapshot and the candidate snapshot may be associated with virtual machines that use the same operation system and have the same applications installed). Once the candidate snapshot has been identified, then data differences (or the delta) between the snapshot and the candidate snapshot may be determined and the snapshot may be stored based on the data differences. In one example, the snapshot may be stored using a forward incremental file that includes the data differences between the snapshot and the candidate snapshot. The forward incremental file may be compressed prior to being stored within a file system, such as distributed file system 112 in FIG. 1C.

In step 316, a merged file associated with the snapshot is generated. The merged file may reference one or more files or one or more data chunks that have been acquired in either step 311 or step 312. In one example, the merged file may comprise a file or a portion of a file that includes pointers to the one or more files or the one or more data chunks. In step 318, the merged file is stored in a metadata store, such as distributed metadata store 110 in FIG. 1C. In step 320, a virtual machine search index for the first virtual machine is updated. The virtual machine search index for the first virtual machine may include a list of files that have been stored in the first virtual machine and a version history for each of the files in the list. In one example, the virtual machine search index for the first virtual machine may be updated to include new files that have been added to the first virtual machine since a prior snapshot of the first virtual machine was taken and/or to include updated versions of files that were previously stored in the first virtual machine.

Figure 3B:
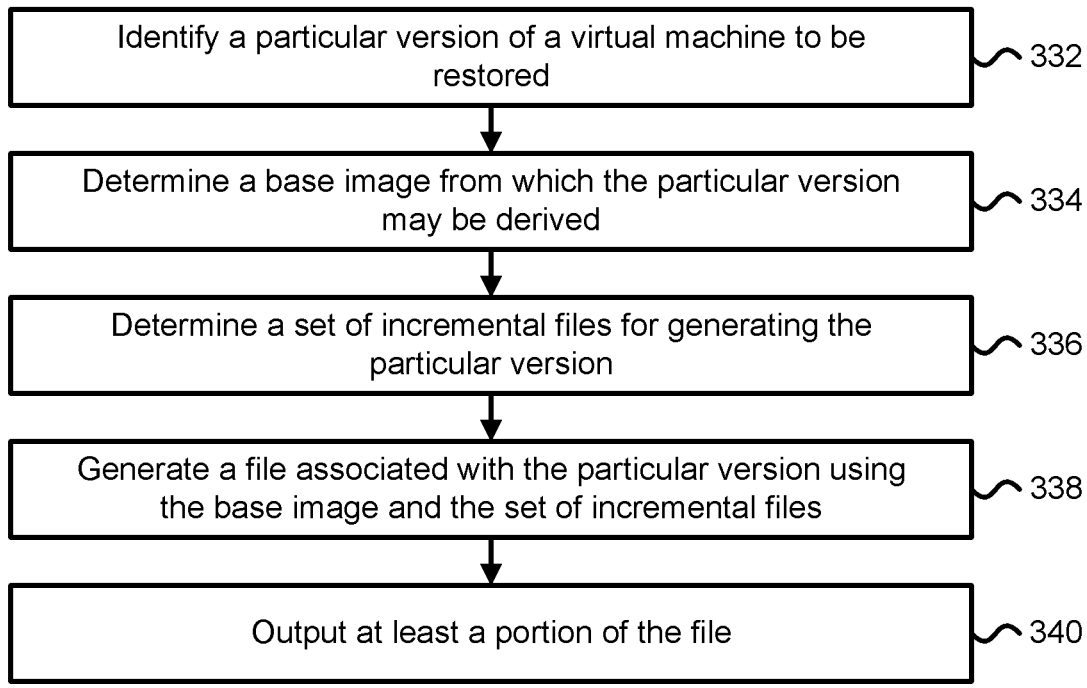
FIG. 3B is a flowchart describing one embodiment of a process for restoring a version of a virtual machine using a data storage system.

FIG. 3B is a flowchart describing one embodiment of a process for restoring a version of a virtual machine using a data storage system. In one embodiment, the process of FIG. 3B may be performed by a storage appliance, such as storage appliance 170 in FIG. 1A.

In step 332, a particular version of a virtual machine to be restored is identified. In step 334, a base image from which the particular version may be derived is determined. In step 336, a set of incremental files for generating the particular version is determined. In one embodiment, the base image and the set of incremental files may be determined from a merged file associated with the particular version of the virtual machine. In some cases, the set of incremental files may include one or more forward incremental files and one or more reverse incremental files. In step 338, a file associated with the particular version is generated using the base image and the set of incremental files. The file may be generated by patching the set of incremental files onto the base image.

In one example, referring to FIG. 2G, if the particular version corresponds with Version V2 of Virtual Machine C, then the base image may correspond with the file Base in FIG. 2G and the set of incremental files may correspond with files F1, F5, and F6 of FIG. 2G. In another example, referring to FIG. 2G, if the particular version corresponds with Version V1 of Virtual Machine B, then the base image may correspond with the file Base in FIG. 2G and the set of incremental files may correspond with files R1, R2, and F3 of FIG. 2G. In step 340, at least a portion of the file is outputted. The at least a portion of the file may be transferred to a computing device, such as computing device 154 in FIG. 1A, or to a virtualization manager, such as virtualization manager 169 in FIG. 1A.

In some embodiments, the base image and a subset of the set of incremental files may correspond with a second virtual machine different from the virtual machine (e.g., the second virtual machine may have been backed up prior to snapshots of the virtual machine being acquired and used to generate a dependent base file for the virtual machine). In this case, the base image may comprise the base image for the second virtual machine and the set of incremental files may include a dependent base file that comprises data differences between the base image for the second virtual machine and a previously acquired base image for the virtual machine. Data deduplication techniques may be applied to identify a candidate base image from which a dependent base file may depend and to generate the dependent base file.

Figure 3C:
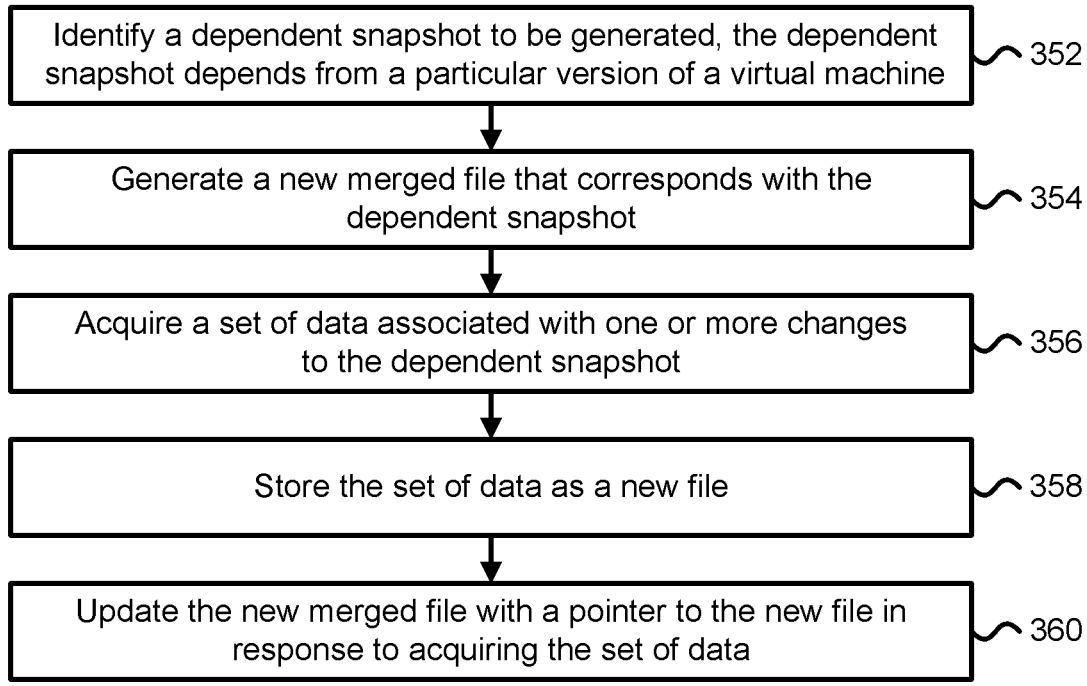
FIG. 3C is a flowchart describing one embodiment of a process for generating a dependent snapshot of a virtual machine and generating one or more new versions of the virtual machine that derive from the dependent snapshot using a data storage system.

FIG. 3C is a flowchart describing one embodiment of a process for generating a dependent snapshot of a virtual machine and generating one or more new versions of the virtual machine that derive from the dependent snapshot using a data storage system. In one embodiment, the process of FIG. 3C may be performed by a storage appliance, such as storage appliance 170 in FIG. 1A.

In step 352, a dependent snapshot to be generated is identified. The dependent snapshot depends from a particular version of a virtual machine (e.g., the most recent version of the virtual machine or a prior point in time version of the virtual machine). In one embodiment, the dependent snapshot may correspond with a test snapshot of the particular version of the virtual machine from which a new application may be installed and run prior to releasing the new application into a production environment. Changes to the test snapshot made by the new application may be stored as one or more new versions that derive from the dependent snapshot. In another embodiment, the dependent snapshot may correspond with a mounted snapshot of the particular version of the virtual machine from which a client may mount the mounted snapshot of the particular version and make subsequent modifications to the mounted snapshot. The subsequent modifications may be stored as one or more new versions that derive from the dependent snapshot.

In step 354, a new merged file that corresponds with the dependent snapshot is generated. In some cases, the new merged file may comprise a duplicate copy of the merged file associated with the particular version of the virtual machine. In one example, referring to FIG. 2G, if the particular version corresponds with Version VX of Virtual Machine A, then the new merged file may comprise a duplicate copy of the merged file associated with Version VX of Virtual Machine A. In this case, the new merged file may be associated with a cloned virtual machine that comprises a cloned version of Version VX of Virtual Machine A. In step 356, a set of data associated with one or more changes to the dependent snapshot is acquired. In step 358, the set of data is stored as a new file. The new file may comprise a forward incremental file. In one embodiment, the new file may be stored using a distributed file system, such as distributed file system 112 and FIG. 1C. In another embodiment, the new file may be stored using a flash-based cache or an SSD. In step 360, the new merged file is updated with a pointer to the new file in response to acquiring the set of data.

In one embodiment, the new file may correspond with changes to a cloned virtual machine that comprises a cloned version of Version VX of Virtual Machine A in FIG. 2G. The changes to the cloned virtual machine may occur subsequent to the generation of the cloned virtual machine. The new file may correspond with a forward incremental file, such as forward incremental F3 in FIG. 2G. In one example, the changes to the cloned virtual machine may be associated with a modification to a database stored on the cloned virtual machine or the installation of a new application on the cloned virtual machine.

In some cases, in response to a particular version of the virtual machine being mounted, a storage appliance may generate a dependent snapshot of the particular version of the virtual machine in order to allow modifications to the dependent snapshot without interfering with or corrupting the particular version of the virtual machine. The dependent snapshot may correspond with a cloned virtual machine that comprises a cloned version of the particular version of the virtual machine. The dependent snapshot may then be modified by a secondary workload that may read data from the dependent snapshot and write data to the dependent snapshot. In some cases, the dependent snapshot may comprise a new full image of the particular version of the virtual machine that may be directly modified by the secondary workload. In other cases, modifications made to the dependent snapshot may be stored in a new file (e.g., a forward incremental) that includes the changes in data from the dependent snapshot.

In one embodiment, upon detection of a failure of a virtual machine (e.g., due to a hardware failure), the most recent version of the virtual machine stored within a storage appliance may be identified and made available to an application requiring data from the virtual machine. In some cases, the most recent version of the virtual machine may be made available via a dependent snapshot or a cloned virtual machine that comprises a cloned version of the most recent version of the virtual machine. In cases where a dependent snapshot has been generated, the application may read and/or modify the data stored within the dependent snapshot without altering the contents of the most recent version of the virtual machine stored within the storage appliance. In one example, in response to detecting a failure of a virtual machine or a failure of a virtual disk of the virtual machine, a primary system may quickly mount the most recent version of the virtual machine stored within a storage appliance and then continue reading and writing data from the mounted version without first restoring and transferring the most recent version of the virtual machine to the primary system.

Figures 4A, 4B:
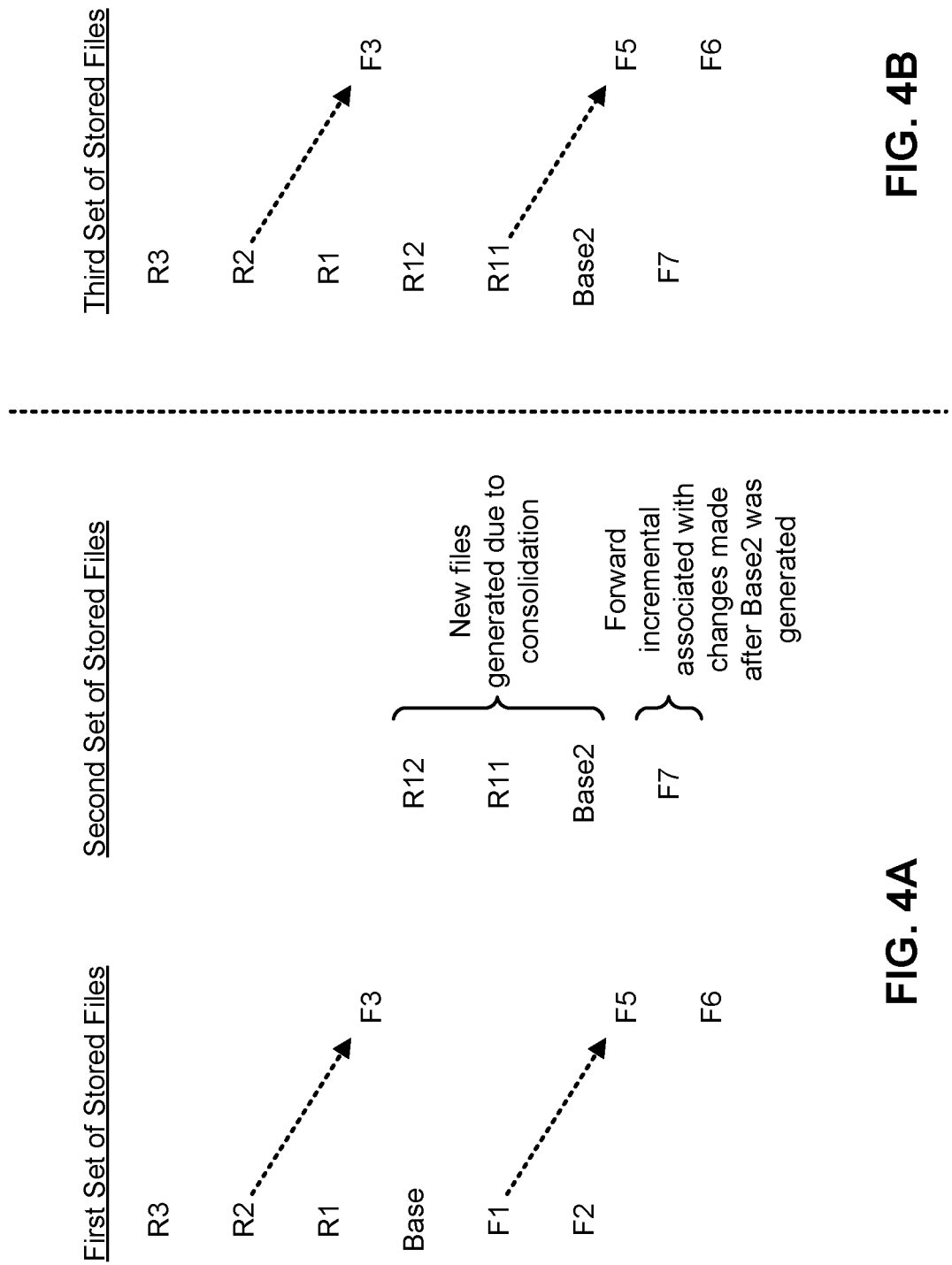
FIGS. 4A-4B depict embodiments of stored files associated with different versions of virtual machines.

FIG. 4A depicts one embodiment of a first set of stored files and a second set of stored files. The first set of stored files may be associated with one or more virtual machines prior to consolidation of the first set of stored files. The one or more virtual machines may include an independent virtual machine (i.e., a virtual machine whose versions derive from merged files that do not include pointers to data associated with a different virtual machine) with six different versions that correspond with files Base, R1-R3, and F1-F2. The one or more virtual machines may include a first dependent virtual machine (i.e., a virtual machine whose versions derive from merged files that include pointers to data associated with an independent virtual machine) associated with file F3 and a second dependent virtual machine associated with files F5-F6.

The second set of files may include one or more new files that have been generated using the first set of stored files in order to consolidate the first set of files and to move a base image file (e.g., the file Base) closer to a more recent version of the independent virtual machine. As depicted, the one or more new files include files R11, R12, and Base2 (i.e., a new base image file). The one or more new files may correspond with a first version of the independent virtual machine associated with the base image (Base), a second version of the independent virtual machine associated with the new base image (Base2), and the versions of the independent virtual machine between the first version and the second version. The second set of files may also include a forward incremental file F7 that may include changes that have occurred subsequent to the generation of the new base image file Base2.

In one embodiment, a first merged file representing a version of the first dependent virtual machine associated with file F3 may not need to be updated due to the relocation of the base image file to a more recent version of the independent virtual machine. However, a second merged file representing a version of the second dependent virtual machine associated with file F5 may need to be updated in order to point to the new file R11. In one example, the second merged file may redirect a pointer from pointing to the file F1 to point to the new file R11. Once the second merged file has been updated from referencing the file F1 to referencing the new file R11, then the file F1 may be released from being stored or deleted.

FIG. 4B depicts one embodiment of a third set of stored files. The third set of stored files may be associated with one or more virtual machines after consolidation of the first set of stored files in FIG. 4A. As depicted, the independent virtual machine has six different versions that correspond with files Base2, R1-R3, and R11-R12. The first dependent virtual machine is associated with file F3 and the second dependent virtual machine is associated with files F5-F6. The files Base and F1-F2 in FIG. 4A have been deleted. Merged files associated with versions of the second dependent virtual machine may include pointers to the new file R11 and the new base image file Base2. In one embodiment, the second dependent virtual machine may correspond with a cloned version of the independent virtual machine that is being used by a secondary workload. The secondary workload may be halted while the merged files associated the second dependent virtual machine are updated to include pointers to the new file R11. In another embodiment, the merged files associated with versions of the second dependent virtual machine may be updated to include pointers to the new file R11 once all applications accessing the second dependent virtual machine have been halted or terminated.

Figure 4C:
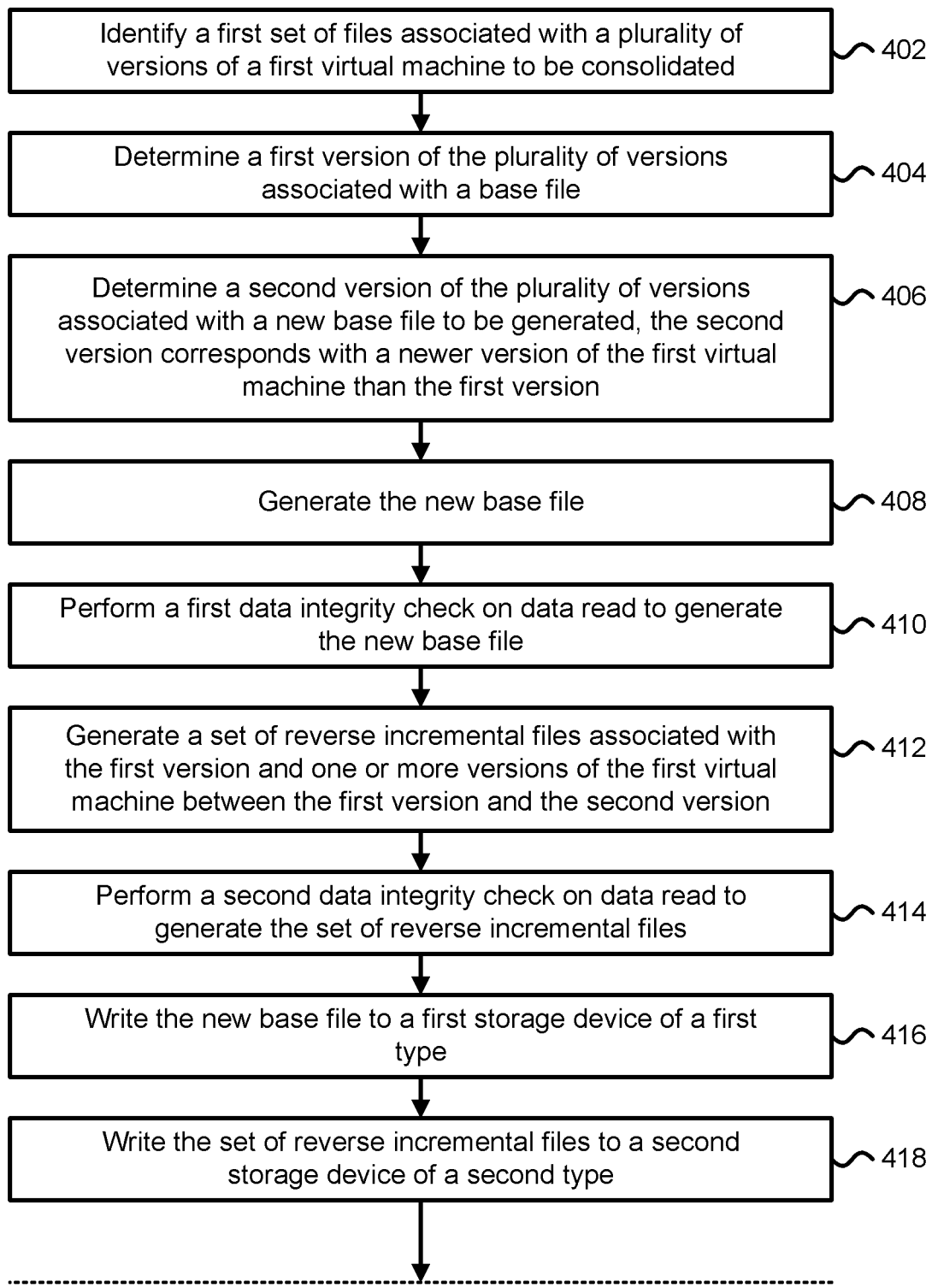
FIGS. 4C-4D depict a flowchart describing one embodiment of a process for managing and storing virtual machine snapshots using a data storage system.
Figure 4D:
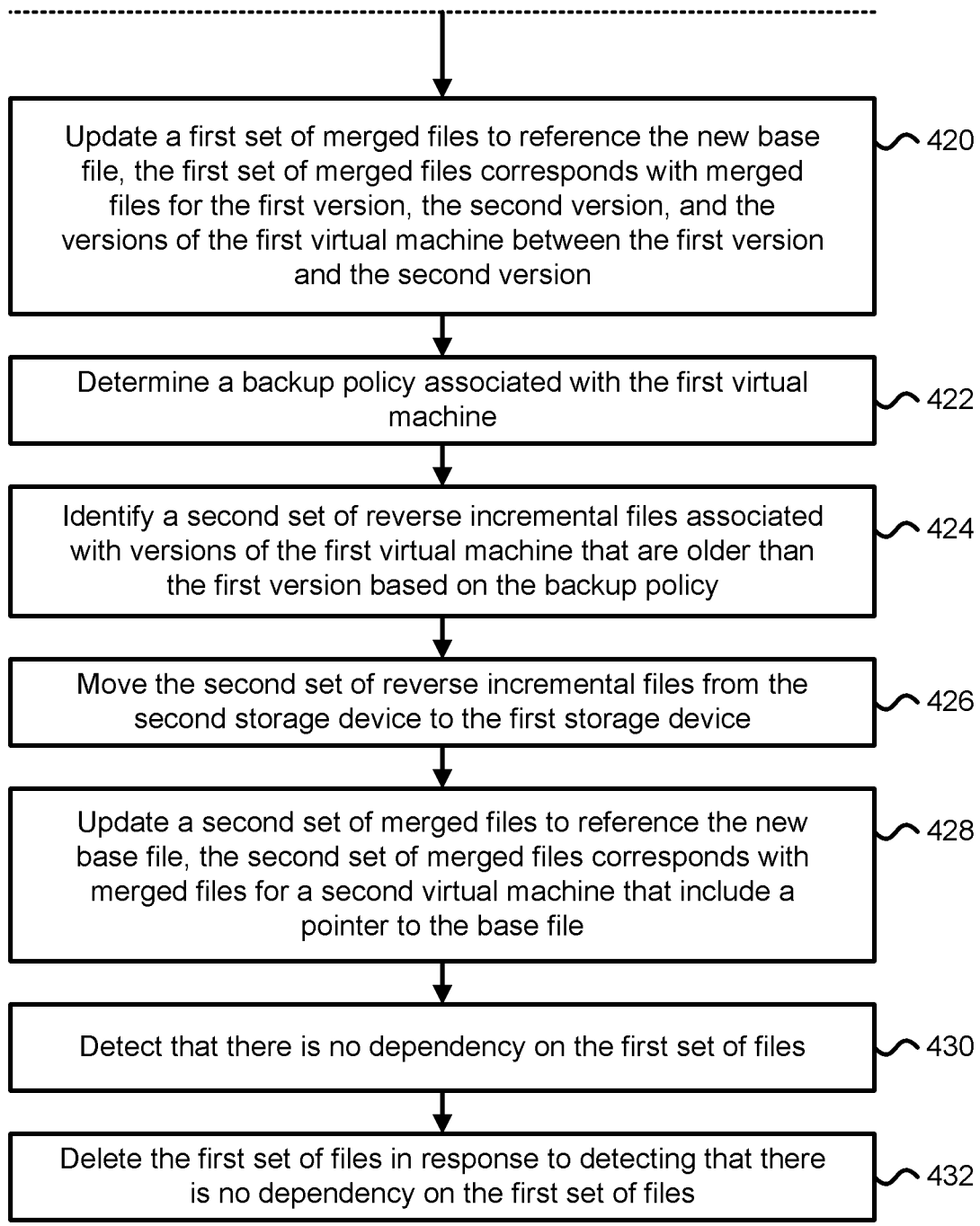

FIGS. 4C-4D depict a flowchart describing one embodiment of a process for managing and storing virtual machine snapshots using a data storage system. In one embodiment, the process of FIGS. 4C-4D may be performed by a storage appliance, such as storage appliance 170 in FIG. 1A.

In step 402, a first set of files associated with a plurality of versions of a first virtual machine to be consolidated is identified. In one example, the first set of files may include a base image file (e.g., generated during a previous consolidation process) and one or more other files associated with versions of the first virtual machine created after the base image file was generated. The one or more other files may include one or more forward incremental files. In one embodiment, the decision to consolidate the first set of files or to generate a new base image file such that the new base image file is closer to the most recent version of the first virtual machine than the base image file may be determined based on a consolidation frequency (e.g., files associated with the first virtual machine may be consolidated every 8 hours, every 24 hours, or every 72 hours). In another embodiment, the decision to consolidate the first set of files or to generate a new base image file such that the new base image file is closer to the most recent version of the first virtual machine than the base image file may be determined based on a number of forward incremental files that need to be patched to the base image file in order to restore the most recent version of the first virtual machine. In one example, if the number of forward incremental files that need to be patched to the base image file in order to restore the most recent version of the first virtual machine is greater than a threshold number of forward incremental files (e.g., more than ten forward incremental files), then the first set of files may be consolidated or identified for consolidation. In another embodiment, the decision to consolidate the first set of files may be determined based on a data size threshold corresponding with a summation of the file sizes for the forward incremental files that need to be patched to the base image file in order to restore the most recent version of the first virtual machine. In one example, if the combined data size for the forward incremental files that need to be patched to the base image file in order to restore the most recent version of the first virtual machine is greater than a threshold data size (e.g., the sum of the file sizes for the forward incrementals is greater than 20 MB), then the first set of files may be consolidated or identified for consolidation. In some embodiments, the first set of files may be automatically consolidated (e.g., without manual intervention) if a consolidation period has passed or expired (e.g., it has been more than 12 hours since the last consolidation occurred or since the base image file was generated), the total number of forward incremental files that need to be patched to the base image file in order to restore the most recent version of the first virtual machine is greater than a threshold number of forward incremental files, and/or the combined data size for the forward incremental files that need to be patched to the base image file in order to restore the most recent version of the first virtual machine is greater than a threshold data size.

In step 404, a first version of the plurality of versions associated with a base file is determined. The base file may comprise a full image (or a complete image) of the first version of the first virtual machine. In step 406, a second version of the plurality of versions associated with a new base file to be generated is determined. The second version may correspond with a newer version of the virtual machine than the first version. In one example, the second version may comprise the most recent version of the first virtual machine. The most recent version of the first virtual machine may correspond with the latest or more recent snapshot of the first virtual machine.

In step 408, the new base file is generated. In one example, the new base file may be generated by generating a full image for the second version. The new base file may be generated by patching one or more forward incremental files to the base file. The one or more forward incremental files may correspond with one or more versions of the first virtual machine that were generated subsequent to the first version. In one example, data changes (e.g., bit differences) associated with a first forward incremental file of the one or more forward incremental files may be applied to the data stored in the base file to generate an intermediate full image and data changes associated with a second forward incremental file associated with the second version of the first virtual machine may be applied to the intermediate full image to generate the new base file. In one example, the new base file may correspond with the new base image file Base2 in FIG. 4A.

In step 410, a first data integrity check is performed on the new base file and/or on data read to generate the new base file. In one example, as data is read from a file system, such as distributed file system 112 in FIG. 1C, storing the base file and one or more incremental files for generating the new base file, checksums may be computed using the data and compared in order to detect errors within the data. As the data may have been replicated over a plurality of physical machines, such as physical machine 120 and physical machine 130 in FIG. 1C, if a data error is detected, then the data error may be corrected using replicated data and the corrected data (e.g., a new correct replica) may be written to one or more of the plurality of physical machines. In another example, as data is read from a file system to generate the new base file, error correcting code (ECC) information may be generated based on the data in order to detect and correct data errors that occurred during transmission or storage of the data. Upon detection of one or more data errors, the one or more data errors may be corrected and the corrected data may be written to one or more of a plurality of physical machines supporting the file system. One benefit of performing a data integrity check as the new base file is generated is that data storage reliability of a data storage system may be improved.

In step 412, a set of reverse incremental files associated with the first version and one or more versions of the first virtual machine between the first version and the second version is generated. The set of reverse incremental files may correspond with data changes that derive from the new base file. In one example, a first reverse incremental file of the set of reverse incremental files may include the data changes (e.g., the bit differences) from the new base file and a second reverse incremental file of the set of reverse incremental files may include the data changes from the new base file patched with the first reverse incremental file. In one example, the set of reverse incremental files may correspond with reverse incremental files R11-R12 in FIG. 4A. In some cases, the set of reverse incremental files may be compressed prior to being stored within a file system, such as distributed file system 112 in FIG. 1C. In step 414, a second data integrity check is performed on the set of reverse incremental files and/or on data read to generate the set of reverse incremental files. One benefit of performing a data integrity check during consolidation or as the set of reverse incremental files is generated is that data storage reliability of a data storage system may be improved. Moreover, periodically performing data integrity checks (e.g., during periodic consolidations that occur on a daily or weekly basis) may allow for a reduction in the degree of replication or a reduction in the number of replicas stored within a cluster.

In step 416, the new base file is written to a first storage device of a first type. In step 418, the set of reverse incremental files is written to a second storage device of a second type. In one example, the first storage device of a first type may comprise a HDD and the second storage device of the second type a comprise an SSD. In another example, the first storage device of the first type may comprise a high density MLC flash-based SSD (e.g., 2-bits/cell or 3-bits/cell) and the second storage device of the second type may comprise a high performance SLC flash-based SSD. In another example, the first storage device of the first type may comprise a hybrid HDD/SSD drive and the second storage device of the second type may comprise an SSD. In another example, the first storage device of the first type may have a first read speed and/or a first write speed and the second storage device of the second type may have a second read speed that is faster than the first read speed and/or a second write speed that is faster than the first write speed. In another example, the first storage device of the first type may have a first read latency and/or a first random access time and the second storage device of the second type may have a second read latency that is less than the first read latency and/or a second random access time that is less than the first random access time speed. One benefit of storing the new base file in a first storage device of a first type and the set of reverse incremental files in a second storage device of a second type is that a particular version of the first virtual machine may be quickly generated by performing a sequential read from the first storage device (e.g., reading a single file from a HDD) to acquire the new base file and, in parallel, performing one or more reads from the second storage device (e.g., performing fast random reads from an SSD) to acquire the set of reverse incremental files.

In step 420, a first set of merged files is updated to reference the new base file. The first set of merged files may correspond with merged files for the first version, the second version, and the versions of the first virtual machine between the first version and the second version. In one example, in reference to FIG. 2G, the first version may correspond with Version VY of Virtual Machine A, the second version may correspond with Version VW of Virtual Machine A, and the versions of the first virtual machine between the first version and the second version may correspond with Version VZ of Virtual Machine A.

In step 422, a backup policy associated with the first virtual machine is determined. The backup policy may specify one or more parameters for backing up the first virtual machine in order to recover information from the first virtual machine in the event that the first virtual machine fails (e.g., due to a system failure). In one example, the backup policy for the first virtual machine may specify that at most a maximum number of versions of the first virtual machine be stored (e.g., a data storage system may store at most 100 backup versions of the first virtual machine). In the case that the maximum number of versions to be stored for a virtual machine is 100, the first 50 versions may correspond with daily snapshots of the virtual machine covering the past 50 days and the last 50 versions may correspond with weekly snapshots of the virtual machine that cover the 50 weeks prior to the past 50 days. The backup policy may specify that a first number of historical snapshots of a virtual machine are stored for points in time within a threshold date from a current date (e.g., that 30 snapshots are available covering the past 30 days) and that a second number of historical snapshots of the virtual machine are stored for points in time greater than the threshold date from the current date (e.g., that 70 snapshots are available covering dates prior to the past 30 days). The backup policy for the first virtual machine may also specify that only versions of the first virtual machine associated with point in time snapshots captured within a particular period of time be stored (e.g., a data storage system may only store backup versions of the first virtual machine associated with point in time snapshots that were captured within the past three years).

In one embodiment, the backup policy for the first virtual machine may specify that versions of the first virtual machine associated with points in time older than a particular time be moved from a second storage device (e.g., an SSD) to a first storage device (e.g., a HDD). In one example, incremental files associated with versions of the first virtual machine older than a particular time (e.g., older than six months ago) be transferred from the second storage device to the first storage device. The backup policy applied to a virtual machine may depend on a classification of the virtual machine. In one example, a virtual machine may be classified as a gold-level virtual machine, a silver-level virtual machine, or a bronze-level virtual machine. The backup policy for a gold-level virtual machine may specify a greater maximum number of versions to be stored than a silver-level virtual machine or a bronze-level virtual machine. The backup policy for a gold-level virtual machine may specify a longer period of time for storing versions of the virtual machine than a silver-level virtual machine or a bronze-level virtual machine.

In one embodiment, a virtual machine may be automatically classified, for example, as a gold-level virtual machine, a silver-level virtual machine, or a bronze-level virtual machine based on a history of restoration requests for snapshots of the virtual machine. In one example, if more than ten snapshots of the virtual machine have been restored within a week of a current date, then the virtual machine may be automatically classified as a gold-level virtual machine. In another example, if no request for a restored snapshot of a virtual machine has been received within a month of a current date, then the virtual machine may be automatically classified as a bronze-level virtual machine. In another embodiment, a virtual machine may be automatically classified based on a history of snapshot mounting requests for snapshots of the virtual machine. Once the virtual machine has been automatically classified, then a particular backup policy for the virtual machine may be applied to the virtual machine based on the classification.

In step 424, a second set of reverse incremental files associated with versions of the first virtual machine that are older than the first version is identified based on the backup policy. In one example, the second set of reverse incremental files may correspond with versions of the first virtual machine that correspond with points in time that occurred more than six months from a current time. In another example, the second set of reverse incremental files may correspond with versions of the first virtual machine that correspond with points in time that occurred more than one year from the time that the second version of the first virtual machine was created or more than one year from the time that a snapshot associated with the second version was captured. In step 426, the second set of reverse incremental files is moved from the second storage device to the first storage device. In some cases, the second set of reverse incremental files may be transferred from an SSD to a HDD. The second set of reverse incremental files may be transferred such that only the 50 most recent snapshots of the first virtual machine are stored on the SSD and all other snapshots of the first virtual machine that were captured prior to the 50 most recent snapshots are stored on the HDD.

In one embodiment, a second set of reverse incremental files may be identified based on a backup policy associated with the virtual machine. The backup policy may specify a maximum number of snapshots allowed for the virtual machine for a particular time period. In one example, the backup policy may specify that the maximum number of snapshots for snapshots corresponding with points in time that occurred more than six months from a current time must not be greater than a first number (e.g., not more than 100 snapshots). The second set of reverse incremental files may then be consolidated to free up storage space. In one example, the second set of reverse incremental files may comprise ten reverse incremental files and the second set of reverse incremental files may be consolidated to generate a single consolidated file corresponding with the earliest point in time snapshot of the ten reverse incremental files.

In step 428, a second set of merged files is updated to reference the new base file. The second set of merged files may correspond with merged files for a second virtual machine that include a pointer to the base file. The second virtual machine may include dependent snapshots that depend on snapshots associated with the first virtual machine. In step 430, it is detected that there is no dependency on the first set of files. In one example, it may be detected that there is no dependency on the first set of files if there are no merged files that include pointers to any of the first set of files. In step 432, the first set of files is deleted in response to detecting that there is no dependency on the first set of files. The first set of files may be deleted to free up data storage space within a data storage system.

FIG. 5A depicts one embodiment of a virtual machine search index, such as virtual machine search index 106 in FIG. 1C. A virtual machine search index for a virtual machine may include a list, table, or other data structure that stores mappings or pointers from different versions of files stored on the virtual machine to different versions of the virtual machine. As depicted, the virtual machine search index includes a list of file versions for File X that are stored on Virtual Machine A. The list of file versions for File X includes Versions X1-X4. Each of the file versions includes a pointer to a particular version of Virtual Machine A that corresponds with the earliest point in time snapshot of Virtual Machine A that includes the file version. For example, version A23 of Virtual Machine A comprises the earliest point in time snapshot of Virtual Machine A that includes version X1 of File X and version A45 of Virtual Machine A comprises the earliest point in time snapshot of Virtual Machine A that includes version X2 of File X. The virtual machine search index also includes a list of file versions for File Y that are stored on Virtual Machine A. The list of file versions for File Y includes a mapping of version Y1 of File Y (saved at time T2) to version A45 of Virtual Machine A and a mapping of version Y2 of File Y (saved at time T8 subsequent to time T2) to version A95 of Virtual Machine A. Version A45 of Virtual Machine A may comprise the 45$^{th}$ version of Virtual Machine A.

FIG. 5B depicts one embodiment of a merged file for the version A45 of Virtual Machine A referred to in FIG. 5A. The merged file includes a first pointer (pBase) that references a base image (e.g., via the path /snapshots/VM_A/s100/s100.full) and other pointers to reverse incremental files (e.g., a pointer to reverse incremental file R55 via the path /snapshots/VM_A/s45/s45.delta). In this case, version A45 of Virtual Machine A may be generated by patching 55 reverse incremental files onto the base image. However, rather than patching the reverse incremental files onto the entire base image, only a portion of the base image associated with a file to be restored (e.g., version X2 of File X) may be acquired from a file system and patched.

FIG. 5C depicts one embodiment of a first portion 502 of the base image referenced by the first pointer (pBase) in FIG. 5B and a second portion 504 of the base image referenced by the first pointer (pBase) in FIG. 5B. In some cases, rather than restoring an entire base image in order to restore a particular version of a file, the first portion 502 of the base image may be restored in order to identify a location of the file within the base image or to identify one or more regions within the base image that store the file. In one example, the first portion 502 of the base image may correspond with one or more file system metadata files. The one or more file system metadata files may store information regarding the type of file system used and information regarding every file and directory on a virtual volume or disk. In some cases, the one or more file system metadata files may be located near the beginning or the end of the base image or near the beginning or the end of a virtual disk partition within the base image. The one or more file system metadata files may include NTFS metadata files, such as an NTFS Master File Table. The NTFS Master File Table may include information for retrieving files from an NTFS partition. The one or more file system metadata files may include a File Allocation Table. The one or more file system metadata files may include information for locating and retrieving files from a virtual disk within the base image (even when due to fragmentation, the file is located in multiple regions within the virtual disk).

Once the first portion 502 of the base image has been acquired and one or more regions within the base image are identified that store the file to be restored, the one or more regions of the base image including the second portion 504 of the base image may be read and patched with data from one or more reverse incremental files in order to generate a portion of a particular version of a virtual machine from which the particular version of the file may be extracted. Thus, a particular version of a file may be quickly extracted by using the virtual machine search index of FIG. 5A to identify a version of a virtual machine that includes the particular version of the file and then restoring only a portion of the version of the virtual machine that includes the particular version of the file. One benefit of extracting the particular version of the file from a small portion of the version of the virtual machine (e.g., 2 MB) rather than from an entire image of the version of the virtual machine (e.g., 20 GB) is that the particular version of the file may be restored in a shorter amount of time.

Figure 5D:
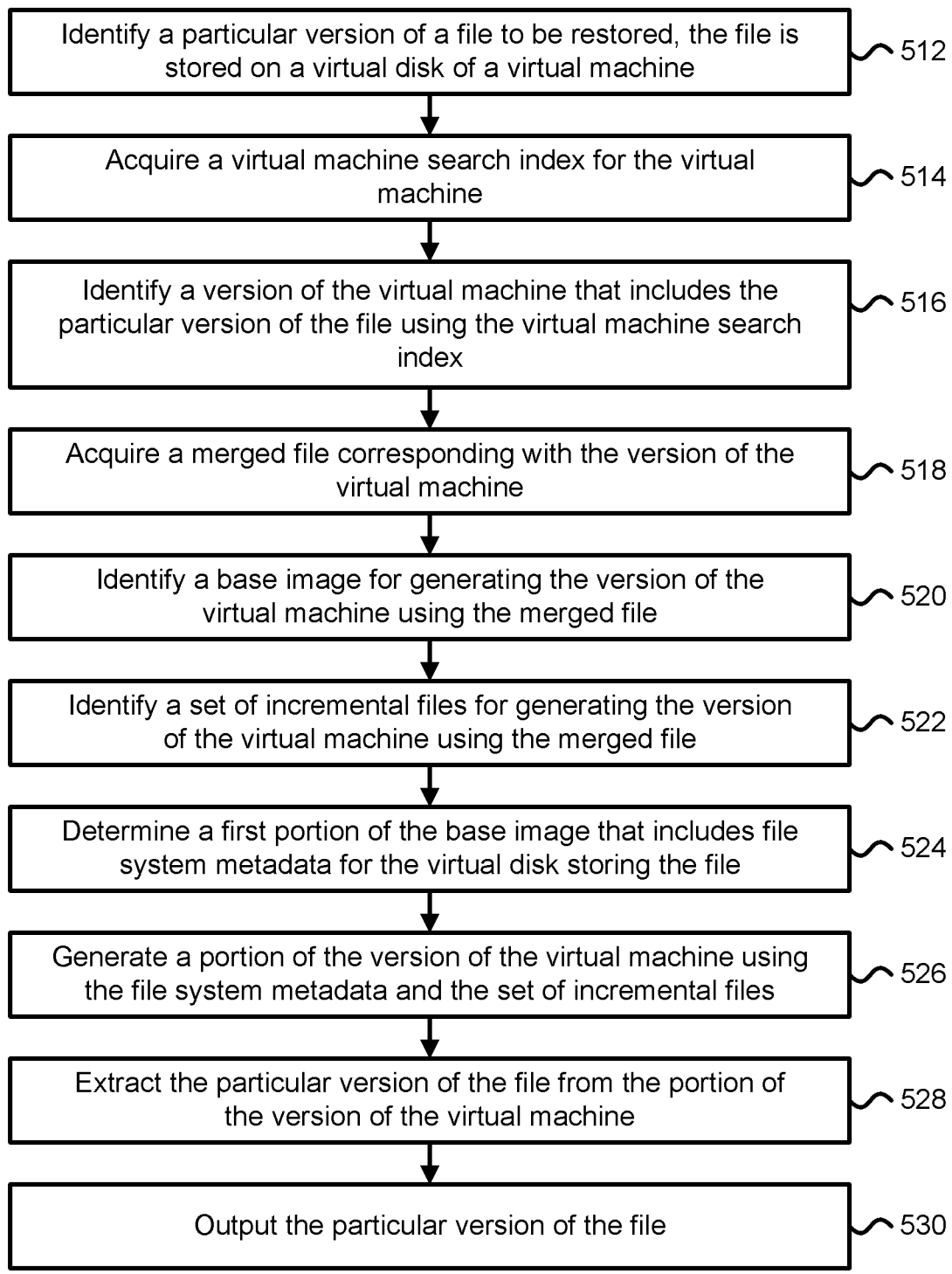
FIG. 5D is a flowchart describing one embodiment of a process for extracting a particular version of a file from one or more snapshots of a virtual machine.

FIG. 5D is a flowchart describing one embodiment of a process for extracting a particular version of a file from one or more snapshots of a virtual machine. In one embodiment, the process of FIG. 5D may be performed by a storage appliance, such as storage appliance 170 in FIG. 1A.

In step 512, a particular version of a file to be restored is identified. The file may be stored on a virtual disk of a virtual machine. The file may comprise or correspond with a database, a spreadsheet, a word processing document, an image file, a video file, a text file, an executable file, an audio file, an electronic message, or an email. The particular version of the file may be selected by an end user of a storage appliance, such as storage appliance 170 in FIG. 1A, using a user interface provided by the storage appliance. In step 514, a virtual machine search index, such as virtual machine search index 106 in FIG. 1C, for the virtual machine is acquired. In step 516, a version of the virtual machine that includes the particular version of the file is identified using the virtual machine search index. In step 518, a merged file corresponding with the version of the virtual machine is acquired. In step 520, a base image for generating the version of the virtual machine is identified using the merged file. In step 522, a set of incremental files for generating the version of the virtual machine is identified using the merged file. In step 524, a first portion of the base image that includes file system metadata for the virtual disk storing the file is determined. In one embodiment, the file system metadata may include information for location and retrieving the file from the virtual disk. In one example, the file system metadata includes NTFS metadata.

In step 526, a portion of the version of the virtual machine is generated using the file system metadata and the set of incremental files. In one embodiment, the portion of the version of the virtual machine is generated by patching the set of incremental files to a second portion of the base image. In another embodiment, the portion of the version of the virtual machine is generated by applying each of the set of incremental files to one or more chunks of data located within the base image. In step 528, the particular version of the file is extracted from the portion of the version of the virtual machine. In step 530, the particular version of the file is outputted. The particular version of the file may be transferred to a computing device, such as computing device 154 in FIG. 1A, or to a virtualization manager, such as virtualization manager 169 in FIG. 1A. In one example, the outputted file may correspond with a database that has been restored to a particular version of the database without having to perform a full restoration of an entire image of a virtual machine. One benefit of extracting the particular version of the file from a portion of the version of the virtual machine that includes the particular version of the file is that the particular version of the file may be quickly restored without having to first restore an entire image of the version of the virtual machine.

In some embodiments, a particular version of a data object to be restored may be identified. The particular version of the data object may correspond with a particular point in time instance of the data object (e.g., a third snapshot of an electronic document captured at a third point in time). The data object may be stored on a virtual disk of a virtual machine. The data object may comprise a database, a spreadsheet, a word processing document, an electronic document, an image, a video, a text file, an executable file, an audio recording, an electronic message, or an email. A version of the virtual machine that includes the particular version of the data object may be identified using a virtual machine search index. Once the version of the virtual machine has been identified, metadata associated with the virtual machine (e.g., file system metadata) may be read in order to identify one or more regions within the virtual disk that store the data object. A portion of the version of the virtual machine may then be generated by reading and/or patching only the one or more regions within the virtual disk that store the data object. The particular version of the data object may then be extracted using only the portion of the version of the virtual machine without having to extract or restore an entire image of the version of the virtual machine.

FIG. 6A depicts one embodiment of a first set of stored files associated with different versions of a Virtual Machine A (VM A) and a second set of stored files associated with different versions of a Virtual Machine B (VM B). The first set of stored files includes a reverse incremental R1, base image Base (corresponding with Version VX of Virtual Machine A), forward incremental F1, and forward incremental F2 (corresponding with Version VY of Virtual Machine A). The second set of stored files includes a dependent base file Dependent_Base and forward incrementals F7-F8. As depicted, the file Dependent_Base may comprise a dependent base file that includes data differences that may be applied to the base image for Virtual Machine A (Base) in order to generate a first version (e.g., Version 1) of Virtual Machine B. In some cases, the dependent base file may be considered a forward incremental file that depends from the base image for Virtual Machine A and may be used to generate the first version of Virtual Machine B. One benefit of generating the first version of Virtual Machine B using a dependent base file is that the versions of Virtual Machine B may be stored using less storage space.

FIG. 6B depicts one embodiment of a merged file for generating Version 1 of Virtual Machine B using the stored files depicted in FIG. 6A. The merged file includes a first pointer (pBase) that references the base image for Virtual Machine A (Base) and a second pointer (pDependent_Base) that references the dependent base file (Dependent_Base). In one embodiment, to generate a full image for Version 1 of Virtual Machine B, the base image (Base) for Virtual Machine A may be acquired and the data changes associated with the dependent base file may be applied to the base image to generate the full image for Version 1 of Virtual Machine B.

FIG. 6C depicts one embodiment of a first set of stored files associated with different versions of a Virtual Machine A (VM A) and a second set of stored files associated with different versions of a Virtual Machine B (VM B) after a first consolidation process has been performed on the first set of files in FIG. 6A. The first consolidation process may generate new files R12, R11, and Base2. The new files may allow a base image for Virtual Machine A to be moved closer to a more recent version of Virtual Machine A. The first set of stored files includes a reverse incremental R1, reverse incremental R11, reverse incremental R12 (corresponding with Version VX of Virtual Machine A), and base image Base2 (corresponding with Version VY of Virtual Machine A). The second set of stored files includes a dependent base file Dependent_Base and forward incrementals F7-F8. As depicted, the file Dependent_Base may comprise a dependent base file that includes data differences that may be applied to a full image of Version VX of Virtual Machine A in order to generate a first version (e.g., Version 1) of Virtual Machine B.

FIG. 6D depicts one embodiment of a merged file for generating Version 1 of Virtual Machine B using the stored files depicted in FIG. 6C. The merged file includes a first pointer (pBase2) that references the base image for Virtual Machine A (Base2), a second pointer (pR11) that references the reverse incremental R11, a third pointer (pR12) that references the reverse incremental R12, and a fourth pointer (pDependent_Base) that references the dependent base file Dependent_Base. In one embodiment, to generate the full image of Version 1 of Virtual Machine B, the base image for Virtual Machine A (Base2) may be acquired, the data changes associated with reverse incremental R11 may be applied to the base image to generate a first intermediate image, the data changes associated with reverse incremental R12 may be applied to the first intermediate image to generate a second intermediate image, and the data changes associated with the dependent base file Dependent_Base may be applied to the second intermediate image to generate the full image for Version 1 of Virtual Machine B.

FIG. 6E depicts one embodiment of a first set of stored files associated with different versions of a Virtual Machine A (VM A) and a second set of stored files associated with different versions of a Virtual Machine B (VM B) after a second consolidation process has been performed on the second set of files in FIG. 6C. The second consolidation process may generate new files R22, R21, and Dependent_Base2. The new files may allow a most recent version of Virtual Machine B (e.g., Version 3 of Virtual Machine B) to move closer to the base image for Virtual Machine A. The first set of stored files includes a reverse incremental R1, reverse incremental R11, reverse incremental R12 (corresponding with Version VX of Virtual Machine A), and base image Base2 (corresponding with Version VY of Virtual Machine A). The second set of stored files includes a dependent base file Dependent_Base2 and reverse incrementals R21-R22. As depicted, the file Dependent_Base2 may comprise a dependent base file that includes data differences that may be applied to a full image of Version VY of Virtual Machine A in order to generate a most recent version (e.g., Version 3) of Virtual Machine B.

FIG. 6F depicts one embodiment of a merged file for generating Version 1 of Virtual Machine B using the stored files depicted in FIG. 6E. The merged file includes a first pointer (pBase2) that references the base image for Virtual Machine A (Base2), a second pointer (pDependent_Base2) that references the dependent base file Dependent_Base2, a third pointer (pR21) that references the reverse incremental R21, and a fourth pointer (pR22) that references the reverse incremental R22. In one embodiment, to generate the full image of Version 1 of Virtual Machine B, the base image (Base2) for Virtual Machine A may be acquired, the data changes associated with the dependent base file Dependent_Base2 may be applied to the base image to generate a first intermediate image, the data changes associated with the reverse incremental R21 may be applied to the first intermediate image to generate a second intermediate image, and the data changes associated with the reverse incremental R22 may be applied to the second intermediate image to generate the full image for Version 1 of Virtual Machine B.

FIG. 6G depicts one embodiment of a first set of stored files associated with different versions of a Virtual Machine A (VM A), a second set of stored files associated with different versions of a Virtual Machine B (VM B), and a third set of stored files associated with different versions of a Virtual Machine C (VM C). The first set of stored files includes a reverse incremental R1, base image Base, and forward incrementals F1-F2. The second set of stored files includes a first dependent base file Dependent_Base and forward incrementals F7-F8. The third set of stored files includes a second dependent base file Dependent_Base3 and forward incremental F15. As depicted, the file Dependent_Base may comprise a first dependent base file that includes data differences that may be applied to the base image for Virtual Machine A (Base) in order to generate a full image for a first version (e.g., Version 1) of Virtual Machine B and the file Dependent_Base3 may comprise a second dependent base file that includes data differences that may be applied to a full image of the first version of Virtual Machine B in order to generate a first version (e.g., Version 1) of Virtual Machine C. In some cases, the dependent base file Dependent_Base may be considered a first forward incremental file that depends from the base image for Virtual Machine A and may be used to generate the first version of Virtual Machine B and the dependent base file Dependent_Base3 may be considered a second forward incremental file that depends from both the base image for Virtual Machine A and the dependent base file Dependent_Base and may be used to generate the first version of Virtual Machine C. One benefit of generating and applying dependent bases either in parallel (e.g., four dependent virtual machines may each be derived from a base image file for an independent virtual machine) or in series (e.g., a first dependent virtual machine may be derived from an independent virtual machine and a second dependent virtual machine may be derived from the first dependent virtual machine) is that the amount of data storage space required to store the different versions of virtual machines may be reduced and the deduplication rate may be increased.

FIG. 6H depicts one embodiment of a merged file for generating Version 1 of Virtual Machine C using the stored files depicted in FIG. 6G. The merged file includes a first pointer (pBase) that references the base image for Virtual Machine A, a second pointer (pDependent_Base) that references the dependent base file for Virtual Machine B, and a third pointer (pDependent_Base3) that references the dependent base file Dependent_Base3 for Virtual Machine C. In one embodiment, to generate the full image of Version 1 of Virtual Machine C, the base image (Base) for Virtual Machine A may be acquired, the data changes associated with the dependent base file Dependent_Base may be applied to the base image to generate a first intermediate image, and the data changes associated with the dependent base file Dependent_Base3 may be applied to the first intermediate image to generate the full image for Version 1 of Virtual Machine C.

In a virtualized environment, redundancy in data stored on two or more different virtual machines may occur due to a common operation system used by the virtual machines (e.g., 100 virtual machines within the virtualized environment may run the same operating system) or due to the cloning of virtual machines within the virtualized environment. A cloned virtual machine may include the same operating system and applications as a virtual machine from which the cloned virtual machine was cloned. In some cases, in a virtualized environment supporting an enterprise, many of the virtual machines used by employees of the enterprise may comprise cloned virtual machines that include a significant amount of redundancy due to the installation of a common operating system and common applications (e.g., more than 85% of the data may be redundant). The commonality between different virtual machines may allow a virtual machine to be efficiently stored as a dependent virtual machine that may be derived from an independent virtual machine. The dependent virtual machine may be associated with a dependent base file that is stored on the same physical machine as a base image associated with the independent virtual machine. The dependent base file and the base image may reside on two different storage devices within the same physical machine. In some cases, to reduce the time needed to restore a version of the dependent virtual machine, the dependent base file and other incremental files associated with the dependent virtual machine may be stored in an SSD of the physical machine and the base image associated with the independent virtual machine may be stored in a HDD of the physical machine.

Figure 6I:
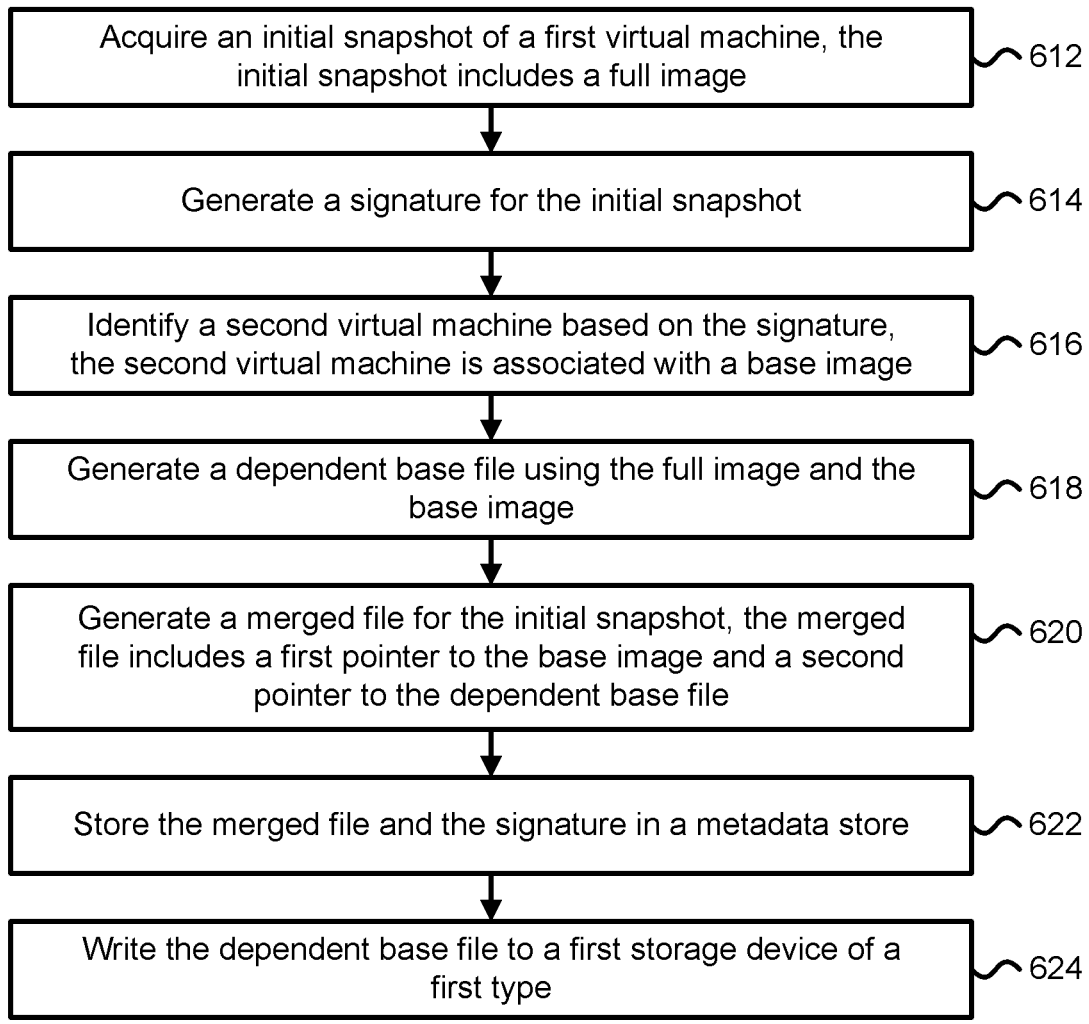
FIG. 6I is a flowchart describing one embodiment of a process for storing snapshots of a virtual machine.

FIG. 6I is a flowchart describing one embodiment of a process for storing snapshots of a virtual machine. In one embodiment, the process of FIG. 6I may be performed by a storage appliance, such as storage appliance 170 in FIG. 1A.

In step 612, an initial snapshot of a first virtual machine is acquired. The initial snapshot may be acquired from a virtualization manager, such as virtualization manager 169 in FIG. 1A. The initial snapshot of the virtual machine may comprise the first point in time version of the first virtual machine saved to a storage appliance, such as storage appliance 170 FIG. 1A. The initial snapshot may include a full image of the first virtual machine or a full image of one or more virtual disks associated with the first virtual machine. In some cases, a signature may be generated for each virtual disk of a virtual machine. In other cases, a signature may be generated for an entire virtual machine that includes one or more virtual disks.

In step 614, a signature for the initial snapshot is generated. In one example, the signature may include one or more hash values. In another example, the signature may include a fixed-length value (e.g., 1 KB or 4 B in size) that is statistically unique to the full image. The signature may be generated using a similarity hashing algorithm. One embodiment of a process for generating a signature of a snapshot is described later in reference to FIG. 6J.

In step 616, a second virtual machine is identified based on the signature. The second virtual machine is associated with a base image. The second virtual machine may comprise a previously backed up virtual machine and may be associated with a second signature. The second virtual machine may be identified based on a comparison of the signature with the second signature. In one embodiment, the second virtual machine may comprise the virtual machine out of a plurality of virtual machines with the closest matching signature to the signature associated with the initial snapshot of the first virtual machine. In some cases, a nearest neighbor search may be performed on a plurality of signatures associated with a plurality of virtual machines in order to identify the second virtual machine.

In step 618, a dependent base file is generated using the full image and the base image. The dependent base file may be generated by determining the data differences between the full image and the base image. The data differences may comprise bit differences between the full image and the base image that are determined using a bitwise XOR operation. In one example, the dependent base file may comprise a forward incremental file that depends from the base image for the second virtual machine and from which the full image may be generated. In step 620, a merged file is generated for the initial snapshot. The merged file may include a first pointer to the base image and a second pointer to the dependent base file. In step 622, the merged file and the signature may be stored in a metadata store, such as distributed metadata store 110 in FIG. 1C.

In step 624, the dependent base file is written to a first storage device of a first type. The dependent base file may be compressed prior to being written to the first storage device. In one embodiment, the base image for the second virtual machine may be located on a first physical machine and the first storage device may be located on the first physical machine. By locating both the base image and the dependent base file on the same physical machine, network traffic may be reduced and the time to restore versions of the first virtual machine may be reduced.

In one embodiment, both the base image and the dependent base file may be located on the first storage device (e.g., an SSD). In another embodiment, the base image for the second virtual machine may be stored on a second storage device of a second type different from the first storage device of the first type. In one example, the dependent base file may be stored using a flash-based memory and the base image may be stored using a HDD. In order to restore the full image, the dependent base file and any other incremental files may be read from the first storage device of the first type and, in parallel, the base image may be read from the second storage device of the second type (e.g., the base image may be read by performing a sequential read from a HDD).

Figure 6J:
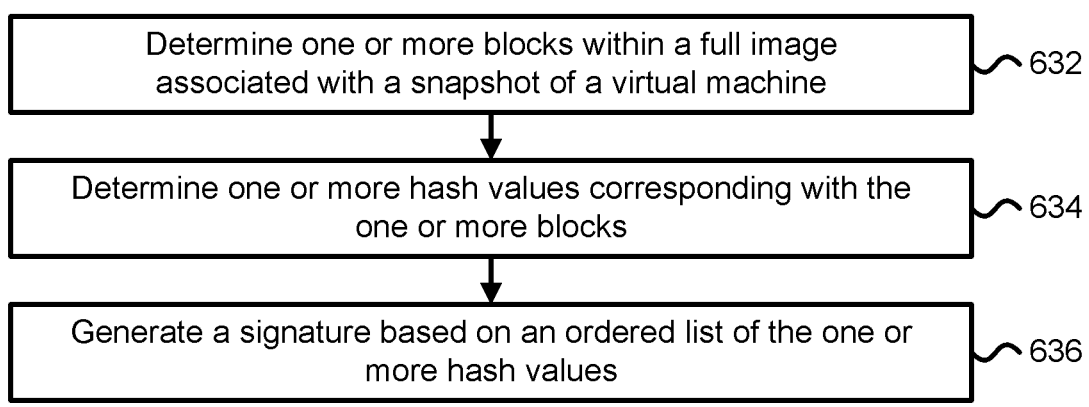
FIG. 6J is a flowchart describing one embodiment of a process for generating a signature of a snapshot.

FIG. 6J is a flowchart describing one embodiment of a process for generating a signature of a snapshot. The process described in FIG. 6J is one example of a process for implementing step 614 in FIG. 6I. In one embodiment, the process of FIG. 6J may be performed by a storage appliance, such as storage appliance 170 in FIG. 1A.

In step 632, one or more blocks within a full image are determined. The full image may be associated with a snapshot of a virtual machine. The full image may correspond with a state of a virtual disk of the virtual machine. In one example, the one or more blocks may comprise sampled data regions associated with a portion of the full image. In another example, the one or more blocks may comprise a set of noncontiguous data regions within the full image. The set of noncontiguous data regions may include a first data region that does not border or overlap with a second data region of the set of noncontiguous data regions. In some cases, the one or more blocks may be arranged in a manner that allows a greater number of hash values to be computed near the beginning or the end of the full image. For example, the one or more blocks may be arranged such that a percentage (e.g., 80%) of the one or more blocks are located within a first portion of the full image (e.g., within the first 2 GB of data). One reason for the increased sampling or weighting of the first portion of the full image is that a common operating system may reside in the first portion of the full image (e.g., the common operating system may reside in the first 1 GB of the full image).

In one embodiment, a first set of data blocks (e.g., 100 4 KB data blocks) may be identified within the full image. Each block of the first set of data blocks may be located within a different region of the full image compared to the other data blocks. Each block of the first set of data blocks may correspond with a different portion of the full image compared with the other data blocks of the first set of data blocks. In one example, a first subset of the first set of data blocks (e.g., the first 50 out of 100 data blocks) may be arranged such that a data block of the first subset is located at the beginning of every 16 MB (or any other fixed data length) of data in the full image. In the case that the first subset of data blocks are arranged every 16 MB, then the offsets for the first subset of data blocks may be at 0, 16 MB, 32 MB, . . . , and 784 MB. In the case that the first subset of data blocks are arranged every 4 MB, then the offsets for the first subset of data blocks may be at 0, 4 MB, 8 MB, . . . , and 196 MB. In one example, a second subset of the first set of data blocks (e.g., the last 50 out of 100 data blocks) may be arranged such that the data blocks are positioned at increasingly greater distances from each other. In this case, the offsets for the second subset of data blocks may be at 1 GB, 1.1 GB, 1.3 GB, 1.6 GB, 2 GB, 2.5 GB, etc. In another example, a second subset of the first set of data blocks (e.g., the last 50 out of 100 data blocks) may be arranged such that the data blocks are positioned at monotonically increasing distances from each other. In this case, the offsets for the second subset of data blocks may be at 1 GB, 1.1 GB, 1.2 GB, 1.5 GB, 2 GB, 3 GB, etc.

In some embodiments, the first set of data blocks identified within the full image may be arranged such the data blocks of the first set of data blocks are spaced at monotonically increasing distances from each other. In other embodiments, the first set of data blocks may be arranged such that a majority of the first set of data blocks are located within a first portion of the full image that is located near or at a beginning or an end of the full image. In one embodiment, each data block of the first set of data blocks exists within a first portion of the full image (e.g., only the first 1.5 GB or other fixed data length of data within the full image may be sampled).

In step 634, one or more hash values corresponding with the one or more blocks are determined. In one embodiment, each of the one or more hash values may be determined using a hash function, such as MD5, SHA2-56, or CRC32. In one example, a first hash value corresponding with a first data block of the one or more blocks may be computed using a hash function and a second hash value corresponding with a second data block of the one or more blocks may be computed using the hash function. In step 636, a signature is generated based on an ordered list of the one or more hash values. In one embodiment, if the hash function for generating the one or more hash values comprises CRC32 and the number of one or more blocks comprises 100 data blocks, then the signature may comprise an ordered list of 100 4B values. To compare a first signature with a second signature, each hash value in the ordered list of hash values for the first signature may be compared with a corresponding hash value in the ordered list of hash values for the second signature. A matching score may be determined based on the number of matched hashes divided by the number of total hashes. In one example, if the number of ordered hash values comprises 100 hash values and the number of matching hash values comprises 70 hash values, then the matching score may comprise 0.7. In this case, a matching score of 1.0 would indicate that all of the ordered hash values between a first signature and a second signature matched. In some cases, if the highest matching score for a virtual machine is less than a threshold value (e.g., is less than 0.5), then the virtual machine may be stored as an independent virtual machine.

In one embodiment, a plurality of noncontiguous data blocks within a full image of a virtual machine may be sampled (e.g., 100 4 KB data blocks out of a full image comprising 100 GB) and a plurality of hash values corresponding with the plurality of noncontiguous data blocks may be generated. A signature for the virtual machine may comprise an ordered list of the plurality of hash values. The plurality of noncontiguous data blocks may be arranged such that data blocks of a first plurality of the plurality of noncontiguous data blocks (e.g., the first 30 out of 100 data blocks) are spaced at a fixed distance from each other and data blocks of a second plurality of the plurality of noncontiguous data blocks (e.g., the last 70 out of 100 data blocks) are spaced at monotonically increasing distances from each other. In this case, each data block of the first plurality may be spaced apart or separated by a fixed data length (e.g., every 16 MB) and each data block of the second plurality may be spaced apart or separate by an increasing data length (e.g., the first two data blocks of the second plurality may be spaced apart by 0.1 GB and the next two data blocks of the second plurality may be spaced apart by 0.2 GB). In some cases, the first plurality of the plurality of noncontiguous data blocks may be determined based on a size and/or a location of an operating system within the full image.

In one embodiment, a size of an operating system or a memory footprint associated with the operating system may be acquired and used to identify a first portion of a full image of a virtual machine (e.g., the first portion of the full image may be located at the beginning of the full image and correspond with the size of the operating system, such as the first 0.5 GB of the full image). In this case, a first set of data blocks may be sampled within the first portion of the full image and a set of hash values corresponding with the first set of data blocks may be generated. A portion of a signature for the virtual machine may comprise an ordered list of the set of hash values. The first set of data blocks may be arranged such that the data blocks of the first set of data blocks are spaced at a fixed distance from each other or are spaced at monotonically increasing distances from each other.

In some embodiments, a dependent virtual machine may depend from a first independent virtual machine at a first point in time and then depend from a second independent virtual machine different from the first independent virtual machine at a second point in time subsequent to the first point in time. In one example, the best matching independent virtual machine for the dependent virtual machine (e.g., the virtual machine with the highest matching score) at the first point in time may comprise the first independent virtual machine and the best matching independent virtual machine for the dependent virtual machine at the second point in time may comprise the second independent virtual machine. In some cases, the updating of the independent virtual machine used for deriving a dependent virtual machine may be performed periodically (e.g., every month).

In some embodiments, a data management system including one or more storage appliances may store a first set of snapshots of a virtual machine on a first storage appliance within a first storage domain (e.g., an on-premise or local storage appliance) and a second set of snapshots of the virtual machine on a second storage appliance within a second storage domain (e.g., a remote storage appliance) or within a cloud-based storage service. In one example, the first set of snapshots may comprise the 50 most recent snapshots of the virtual machine and the second set of snapshots may comprise all the other snapshots of the virtual machine. In another example, the first set of snapshots may comprise all snapshots of a virtual machine captured within the past year and the second set of snapshots may comprise all snapshots of the virtual machine captured within the past five years. In another example, a storage appliance, such as storage appliance 170 in FIG. 1A, may manage and store a first set of snapshots comprising all snapshots of a virtual machine captured within a first period of time (e.g., within the past three months) and the storage appliance may push all snapshots of the virtual machine captured within a second period of time (e.g., within the past ten years) to a remote storage appliance or a cloud-based storage service. In some cases, a cloud-based storage service may run an integrated software stack including a data management system, such as data management system 102 in FIG. 1C, a distributed job scheduler, a distributed metadata store, and a distributed file system. One benefit of managing and storing snapshots of one or more virtual machines using a hybrid local/remote data management system that includes a local storage appliance and a remote storage appliance and/or a cloud-based storage service is that the hybrid local/remote data management system may provide near instantaneous restoration of the snapshots of the one or more virtual machines while providing disaster-resistant data protection in the event that the first storage appliance or the remote storage appliance fails.

FIG. 7A depicts one embodiment of a first set of stored files associated with different versions of a Virtual Machine A (VM A) and a second set of stored files associated with different versions of a Virtual Machine B (VM B) located within a first storage domain (Storage Domain A). The first set of stored files includes a base image associated with Virtual Machine A (Base_A) and the second set of stored files includes a base image associated with Virtual Machine B (Base_B). In some cases, the Virtual Machine B may be associated with a reverse incremental RB1 that is stored within the first storage domain (e.g., a local storage appliance) and 728 other reverse incrementals that are stored within a second storage domain (e.g., within a remote storage appliance or a cloud-based storage service) different from the first storage domain. In one example, in order generate a full image for one of the versions of Virtual Machine B associated with the 728 other reverse incrementals, one or more of the 728 reverse incrementals may be transferred to the first storage domain from the second storage domain and the full image may be generated within the first storage domain. In this case, the one or more of the 728 reverse incrementals transferred to the first storage domain may be cached within the first storage domain for future access to the same data. In another example, in order generate a full image for one of the versions of Virtual Machine B associated with the 728 other reverse incrementals, the full image may be generated within the second storage domain and then transferred to the first storage domain.

FIG. 7B depicts one embodiment of a merged file for generating Version 732 of Virtual Machine B using the stored files depicted in FIG. 7A. The merged file includes a first pointer (pBase_B) that references the base image for Virtual Machine B (Base_B), a second pointer (pFB1) that references the forward incremental FB1, and a third pointer (pFB2) that references the forward incremental FB2. In one embodiment, to generate a full image for Version 732 of Virtual Machine B, the base image (Base_B) for Virtual Machine B may be acquired, the data changes associated with the forward incremental FB1 may be applied to the base image to generate a first intermediate image, and the data changes associated with forward incremental FB2 may be applied to the first intermediate image to generate the full image of Version 732 of Virtual Machine B.

FIG. 7C depicts one embodiment of a third set of stored files associated with different versions of the Virtual Machine A (VM A) depicted in FIG. 7A and a fourth set of stored files associated with different versions of the Virtual Machine B (VM B) depicted in FIG. 7A located within a second storage domain (Storage Domain B) different from the first storage domain (Storage Domain A) depicted in FIG. 7A. In some cases, the first storage domain may communicate with the second storage domain via a network, such as a wide area network or the Internet. The third set of stored files includes a base image associated with Virtual Machine A (Base_A) and the fourth set of stored files includes a dependent base file associated with Virtual Machine B (Dependent_Base_B). As depicted, Virtual Machine A is associated with 58 different versions corresponding with a forward incremental FA1, a base image Base_A, and 56 reverse incrementals RA1-RA56. Virtual Machine B is associated with 732 different versions corresponding with a forward incrementals FB1-FB2, a dependent base file Dependent_Base_B, and 729 reverse incrementals RB1-RB729. In some cases, the second storage domain may include a remote storage appliance or a cloud-based storage service.

FIG. 7D depicts one embodiment of a merged file for generating Version 732 of Virtual Machine B using the stored files depicted in FIG. 7C. The merged file includes a first pointer (pBase_A) that references the base image for Virtual Machine A (Base_A), a second pointer (pDependent_Base_B) that references the dependent base file for Virtual Machine B (Dependent_Base_B), a third pointer (pFB1) that references the forward incremental FB1, and a fourth pointer (pFB2) that references the forward incremental FB2. In one embodiment, to generate a full image for Version 732 of Virtual Machine B, the base image for Virtual Machine A (Base_A) may be acquired and the data changes associated with the dependent base file associated with Virtual Machine B (Dependent_Base_B) may be applied to the base image to generate a first intermediate image, the data changes associated with forward incremental FB1 may be applied to the first intermediate image to generate a second intermediate image, and the data changes associated with forward incremental FB2 may be applied to the second intermediate image to generate the full image of Version 732 of Virtual Machine B.

In one embodiment, the first storage domain in FIG. 7A may comprise a local storage domain within a local data center and the second storage domain in FIG. 7C may comprise a remote storage domain within a remote data center. The files stored within the local storage domain may be stored using a first storage appliance, such as storage appliance 170 in FIG. 1A. The files stored in the remote storage domain may be stored using a second storage appliance, such as storage appliance 140 in FIG. 1A. In another embodiment, the first storage domain in FIG. 7A may comprise a remote storage domain and the second storage domain in FIG. 7C may comprise a local storage domain.

In some embodiments, a first storage appliance may determine whether files stored within the first storage appliance are to be archived or transferred to a second storage appliance based on a threshold number of versions. In one example, once a total number of versions of a virtual machine stored within the first storage appliance reaches a maximum number of versions, then the oldest versions of the virtual machine that cause the maximum number of versions to be exceeded may be transferred to the second storage appliance or to a cloud-based storage device. In another example, if a maximum number of versions for a first storage appliance storing the first set of stored files associated with Virtual Machine A in FIG. 7A is three, then the 55 versions of Virtual Machine A that are older than the version associated with reverse incremental RA1 may be transferred to a second storage appliance, such as the second storage appliance storing the third set of stored files in FIG. 7C. The 55 versions of Virtual Machine A transferred to the second storage appliance may correspond with reverse incrementals RA2-RB56 in FIG. 7C.

In some embodiments, a first storage appliance may determine whether files stored within the first storage appliance are to be archived or transferred to a second storage appliance based on a threshold point in time. In one example, once a particular version of a virtual machine associated with a particular point in time is older than the threshold point in time (e.g., the particular point in time is older than three months from a current time), then the particular version may be transferred to the second storage appliance or to a cloud-based storage device. In another example, if 728 versions of Virtual Machine B in FIG. 7A are older than a threshold point in time (e.g., more than 30 days old or more than one year old), then the 728 versions of Virtual Machine B may be transferred to a second storage appliance, such as the second storage appliance storing the fourth set of stored files in FIG. 7C. The 728 versions of Virtual Machine B transferred to the second storage appliance may correspond with reverse incrementals RB2-RB729 in FIG. 7C.

In some embodiments, in order to minimize network congestion, data associated with virtual machine snapshots may be deduplicated and/or compressed prior to being transferred from a first storage domain to a second storage domain. In one example, a dependent base file or a base image may be compressed using a lossless data compression algorithm such as LZ4 or LZ77 prior to being transferred to the second storage domain.

In some embodiments, rather than transferring a base image associated with a virtual machine from a first storage domain to a second storage domain, a dependent base file that derives from another base image within the second storage domain may be transferred instead. In one example, rather than transferring the base image associated with Virtual Machine B (Base_B) in FIG. 7A to the second storage domain, a dependent base file (Dependent_Base_B) may be generated in the first storage domain and transferred to the second storage domain if the base image associated with Virtual Machine A (Base_A) from which the dependent base file depends exists within the second storage domain. In some cases, a first storage appliance within the first storage domain may identify a base image from which a dependent base file may be derived by acquiring a list of independent virtual machines within the second storage domain, determining a matching signature score (e.g., determined based on a number of matched hashes) for each independent virtual machine on the list of independent virtual machines that exists within the first storage domain, and identifying the independent virtual machine stored within the first storage domain with the highest matching signature score. In one embodiment, a dependent base file associated with a virtual machine may be transferred in place of a base image for the virtual machine based on a classification of the virtual machine. For example, if the virtual machine is classified as a gold-level virtual machine, then the base image may be transferred to the second storage domain. However, if the virtual machine is classified as a bronze-level virtual machine, then the dependent base file may be transferred to the second storage domain.

Figure 7E:
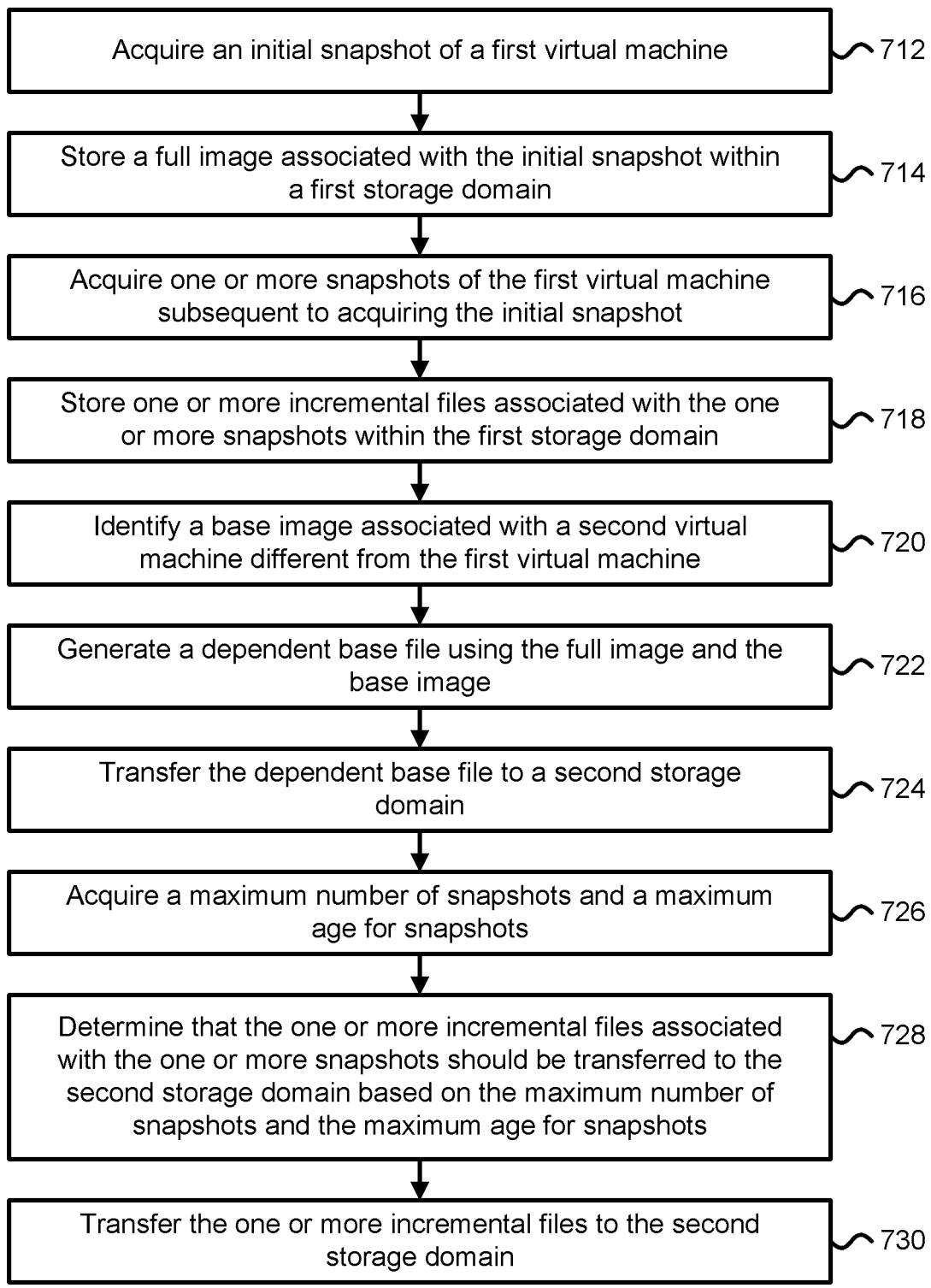
FIG. 7E is a flowchart describing one embodiment of a process for managing and storing snapshots of a virtual machine using a hybrid local/remote data management system.

FIG. 7E is a flowchart describing one embodiment of a process for managing snapshots of a virtual machine using a hybrid local/remote data management system. In one embodiment, the process of FIG. 7E may be performed by a storage appliance, such as storage appliance 170 in FIG. 1A.

In step 712, an initial snapshot of a first virtual machine is acquired. The initial snapshot may be acquired from a virtualization manager, such as virtualization manager 169 in FIG. 1A. The initial snapshot of the virtual machine may comprise the first point in time version of the first virtual machine saved to a storage appliance, such as storage appliance 170 FIG. 1A. The initial snapshot may include a full image of the first virtual machine or a full image of one or more virtual disks associated with the first virtual machine. In one embodiment, a signature may be generated from the full image associated with the initial snapshot in order to identify a candidate base image associated with a second virtual machine. In one example, a signature may be generated for the entire first virtual machine or for a first virtual disk of the first virtual machine in order to identify the candidate base image.

In step 714, a full image associated with the initial snapshot is stored within a first storage domain. The full image may be stored using a local storage appliance within the first storage domain. In step 716, one or more snapshots of the first virtual machine are acquired subsequent to acquiring the initial snapshot. In one example, the initial snapshot of the first virtual machine may comprise a first version of the first virtual machine and the one or more snapshots of the first virtual machine may comprise one or more subsequent versions of the first virtual machine. In step 718, one or more incremental files associated with the one or more snapshots are stored within the first storage domain. The one or more incremental files may be stored using the local storage appliance within the first storage domain. The one or more incremental files may include one or more forward incremental files and/or one or more reverse incremental files.

In step 720, a base image associated with a second virtual machine different from the first virtual machine is identified. The second virtual machine may comprise a virtual machine that is stored within the first storage domain and that is stored within a second storage domain with the highest matching signature score or the most data similarity with the full image stored within the first storage domain. In step 722, a dependent base file is generated using the full image and the base image. In step 724, the dependent base file is transferred to a second storage domain. In one embodiment, the second storage domain may comprise a remote storage appliance. In another embodiment, the second storage domain may comprise a cloud-based storage service.

In step 726, a maximum number of snapshots and a maximum age for snapshots are acquired. In one example, the maximum number of snapshots may impose a limit to the number of versions of the first virtual machine that may be stored within the first storage domain. In another example, the maximum age for snapshots may impose a limit on the number of versions of the first virtual machine that may be stored within the first storage domain. In step 728, it is determined that the one or more incremental files associated with the one or more snapshots should be transferred to the second storage domain based on the maximum number of snapshots and/or the maximum age for snapshots. In step 730, the one or more incremental files are transferred to the second storage domain. In some cases, after the one or more incremental files have been transferred to the second storage domain, the one or more incremental files may be deleted from the first storage domain to free-up storage space within the first storage domain.

In some cases, one or more snapshots of the first virtual machine may be transferred to the second storage domain upon detection that the first storage domain stores more than a threshold number of snapshots for the first virtual machine. In other cases, every snapshot of the first virtual machine that is stored within the first storage domain may be automatically transferred to the second storage domain. The snapshots of the first virtual machine may be directly accessed via the first storage domain or the second storage domain. In response to a request from the first storage domain, the second storage domain may transfer a snapshot of the first virtual machine to the first storage domain (e.g., a snapshot that was originally transferred from the first storage domain to the second storage domain may be transferred back to the first storage domain).

In one embodiment, a hybrid local/remote data management system may include a remote replication system that replicates data between a local storage appliance and a remote storage appliance and/or a cloud-based storage service in real-time. The replicated data may be deduplicated and compressed prior to being transferred between the local storage appliance and the remote storage appliance or the cloud-based storage service. The hybrid local/remote data management system may include a hybrid data management system that manages snapshots of one or more virtual machines across a local storage appliance and a remote storage appliance and/or a cloud-based storage service in real-time. The hybrid data management system may dynamically move data associated with the snapshots based on user configured parameters such as a maximum number of snapshots that may be stored on the local storage appliance, a maximum number of snapshots that may be stored on the remote storage appliance, a maximum age for the snapshots stored on the local storage appliance, and a maximum age for the snapshots stored on the remote storage appliance. In some cases, the hybrid data management system may cause a first set of snapshots for the one or more virtual machines to be stored on the local storage appliance, a second set of snapshots for the one or more virtual machines to be stored on the remote storage appliance, and a third set of snapshots for the one or more virtual machines to be stored on both the local storage appliance and the remote storage appliance (e.g., the third set of snapshots may comprise replicated snapshots).

In one embodiment, a virtualized environment cloning application may be used to create a cloned environment of a set of virtualized production services running on a plurality of virtual machines within a production environment. The virtualized environment cloning application may comprise a software-level component of a storage appliance or an application running on a storage appliance, such as storage appliance 170 in FIG. 1C. The virtualized environment cloning application may generate the cloned environment to enable the testing of new features within the cloned environment or for experimental or analytical purposes. The cloned environment may include a plurality of cloned virtual machines that are derived from snapshots of the plurality of virtual machines within the production environment at a particular point in time. In one example, the cloned environment may comprise a virtual laboratory of networked virtual machines in which applications may be tested without interfering with the production environment.

The set of virtualized production services may include a first service (e.g., a database service) and a second service that depends on the first service (e.g., an inventory management application that depends on the database service). The first service may be run using a first virtual machine of the plurality of virtual machines and the second service may be run using a second virtual machine of the plurality of virtual machines. In some cases, upon a selection of the second service for cloning (e.g., via a GUI selection by an end user of a storage appliance), other services on which the second service relies, such as the first service, may be automatically identified due to dependencies with the second service. The dependencies may be identified via a dependency mapping table stored within a distributed metadata store, such as distributed metadata store 110 in FIG. 1C. Once the set of virtualized production services have been identified, each of the set of virtualized production services may be paused or quiesced while snapshots of the plurality of virtual machines running the set of virtualized production services are captured. While the set of virtualized production services are paused, a virtualization interface, such as virtualization interface 104 in FIG. 1C, may be used to acquire the snapshots of the plurality of virtual machines. Once the snapshots of the plurality of virtual machines have been acquired, then cloned versions of the plurality of virtual machines may be generated and stored using a distributed file system, such as distributed file system 112 in FIG. 1C.

In cases where the cloned versions of the plurality of virtual machines must be configured with the same IP addresses as the plurality of virtual machines within the production environment (e.g., due to the inability of a backup system to modify an application specific configuration that includes an IP address), the cloned environment may have to be brought up in a private network to prevent conflicts with the plurality of virtual machines within the production environment. In one embodiment, a gateway virtual machine may be configured to act as a gateway between the cloned environment and an outside network. All requests to IP addresses that are not part of the cloned environment may be routed through the gateway virtual machine to the outside network. The gateway may act as a Network Address Translation (NAT) layer for external clients that want to connect to the cloned environment from the outside network. Each of the virtualized production services within the cloned environment may be exposed through separate IP addresses to the outside network and requests may be routed to the appropriate virtualize production service by the NAT layer.

In some cases, runbook automation techniques or other workflow automation techniques may be used to generate and bring up the cloned versions of the plurality of virtual machines in an appropriate order such that a cloned virtual machine is not brought up until dependent virtual machines have been brought up and the applications running on the dependent virtual machines are running. The appropriate order may be specified using a configuration file that may be created and/or be modified by a system administrator or a virtualization administrator prior to generation of the cloned versions. In one example, in the case of a web server that relies on a database to display a web site, the database may be automatically brought up first in the cloned environment before the web server is brought up since the web server may experience errors if it is not able to access the database.

Figure 8:
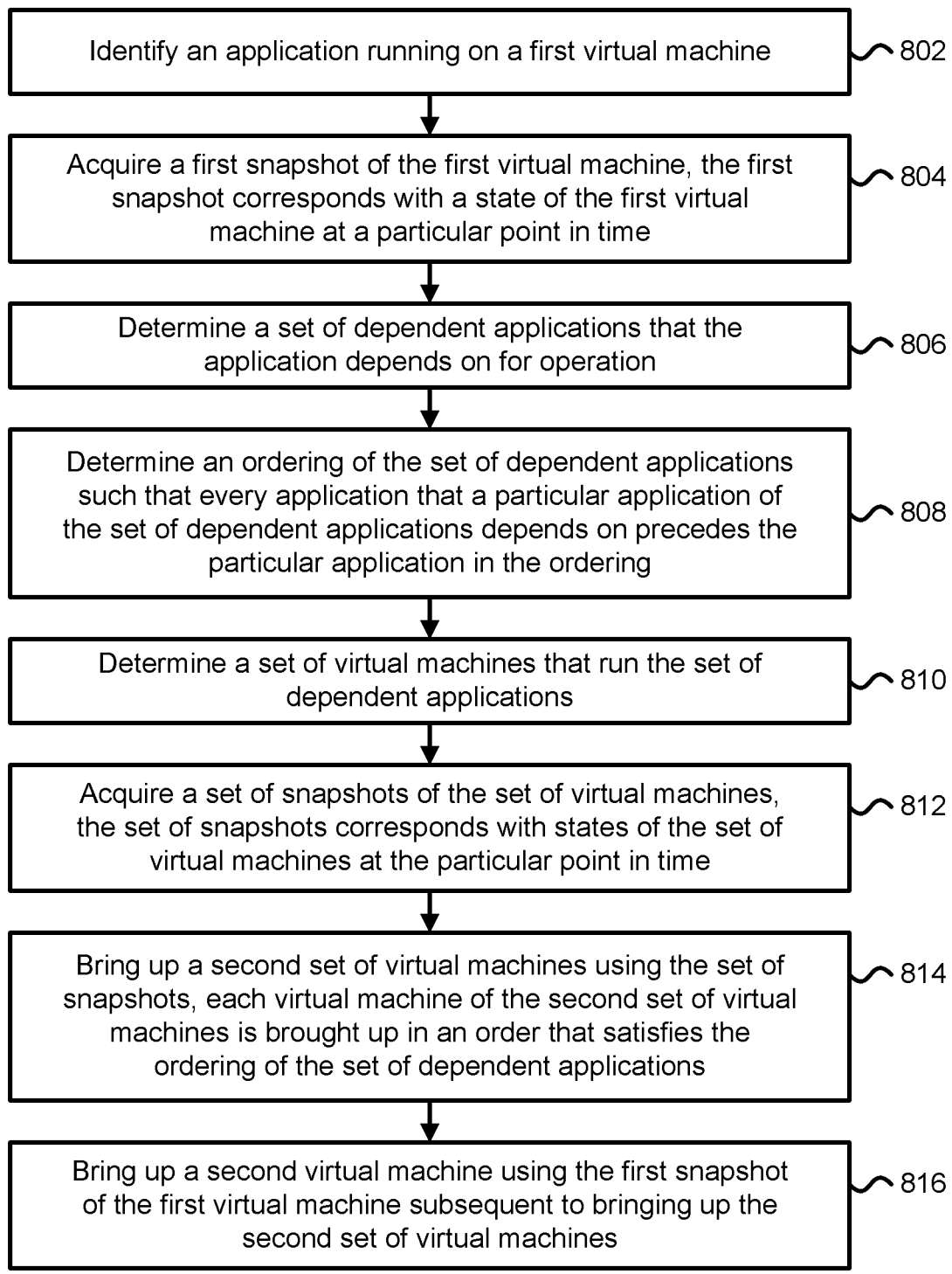
FIG. 8 is a flowchart describing one embodiment of a process for generating a cloned virtual machine environment.

FIG. 8 is a flowchart describing one embodiment of a process for automating the generation of a cloned virtual machine environment. In one embodiment, the process of FIG. 8 may be performed by a storage appliance, such as storage appliance 170 in FIG. 1A.

In step 802, an application running on a first virtual machine is identified. The application may be identified by an end user of a storage appliance using a graphical user interface. The application may comprise an application to be cloned. The application may comprise one application of a plurality of applications running on the first virtual machine in which the first virtual machine is to be cloned. The first virtual machine may comprise one virtual machine out of a plurality of virtual machines that are to be cloned in order to run, for example, a set of virtualized production services within a cloned environment. In step 804, a first snapshot of the first virtual machine is acquired. The first snapshot may correspond with a state of the first virtual machine at a particular point in time. In step 806, a set of dependent applications that the application depends on for operation is determined. In one example, the application may comprise an inventory management application that depends on a database application (e.g., the inventory management application may use the database application in order to access or store inventory-related information). In this case, the inventory management application may run on the first virtual machine and the database application may run on a different virtual machine that is in communication with the first virtual machine.

In step 808, an ordering of the set of dependent applications is determined such that every application that a particular application of the set of dependent applications depends on precedes the particular application in the ordering. In one example, the application may depend on a second application, which in turn depends on a third application. In this case, the ordering may comprise the third application followed by the second application followed by the application. The dependencies between each application of the set of dependent applications may be determined using a dependency mapping table or using a direct acyclic graph (DAG) in which vertices of the DAG correspond with the applications of the set of dependent applications and directed edges between the vertices may correspond with the dependencies. In one example, a directed edge from a predecessor node to a successor node may represent that the successor node depends on the predecessor node.

In step 810, a set of virtual machines that run the set of dependent applications is determined. The set of virtual machines may correspondence with virtual machines running the set of dependent applications at the particular point in time. In step 812, a set of snapshots of the set of virtual machines is acquired. The set of snapshots may correspond with states of the set of virtual machines at the particular point in time. In some cases, the set of virtual machines may be paused or quiesced while the set of snapshots are captured.

In step 814, a second set of virtual machines is brought up using the set of snapshots. Each virtual machine of the second set of virtual machines is brought up in an order that satisfies the ordering of the set of dependent applications. The second set of virtual machines may comprise cloned versions of the set of virtual machines that run the set of dependent applications. In step 816, a second virtual machine is brought up using the first snapshot of the first virtual machine subsequent to bringing up the second set of virtual machines. The second virtual machine may comprise a cloned version of the first virtual machine. In some embodiments, where the cloned versions of the first virtual machine and the set of virtual machines must be configured with the same IP addresses as the first virtual machine and the set of virtual machines, the cloned versions may be brought up in a private network and a gateway virtual machine may be configured to act as a gateway between the cloned versions within the private network and outside networks.

Figure 9:
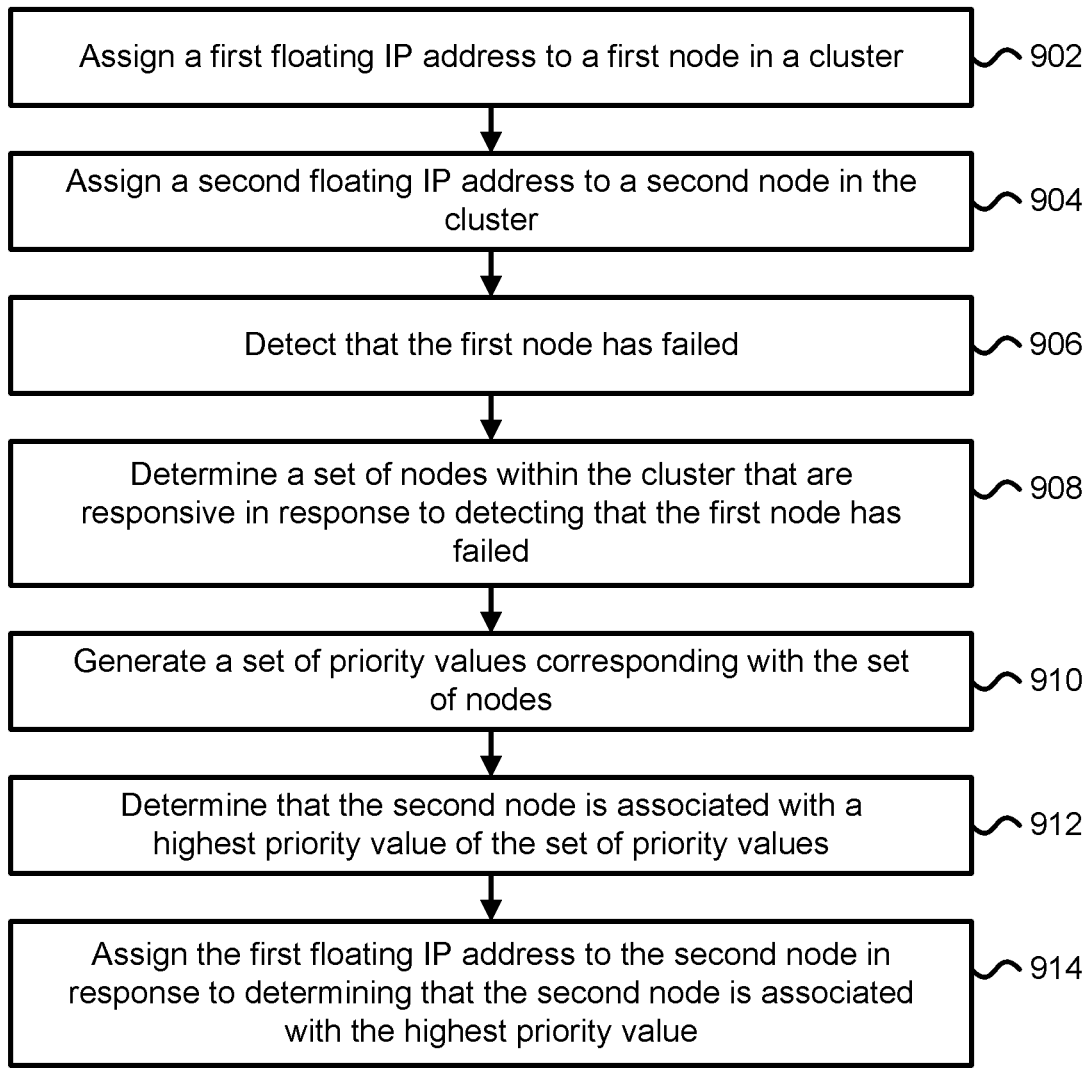
FIG. 9 is a flowchart describing one embodiment of a process for operating a cluster-based file server.

FIG. 9 is a flowchart describing one embodiment of a process for operating a cluster-based file server that does not require a front-end load balancer. In one embodiment, the process of FIG. 9 may be performed by a storage appliance, such as storage appliance 170 in FIG. 1A.

In step 902, a first floating IP address is assigned to a first node in a cluster. The first node may respond to requests made to the first floating IP address. The cluster may comprise a plurality of physical machines. Each physical machine of the plurality of physical machines may correspond with a node in the cluster. The cluster may comprise a cluster-based network file server. In one embodiment, a hypervisor in communication with the cluster may be configured with the first floating IP address. In some cases, the hypervisor may not provide a failover mechanism nor be able to update or reconfigure the first floating IP address after the hypervisor has been configured with the first floating IP address.

In step 904, a second floating IP address is assigned to a second node in the cluster. The first floating IP address is different from the second floating IP address. The second node may respond to requests made to the second floating IP address. In step 906, it is detected that the first node has failed. In one example, the first node may become nonresponsive to communications over the network due to a hardware failure or a network failure. In one embodiment, a cluster management system may periodically monitor the availability of nodes within the cluster and flag a node failure when a particular node within the cluster goes down or becomes nonresponsive after a threshold period of time (e.g., a node has been nonresponsive for more than thirty seconds or two minutes). In step 908, a set of nodes within the cluster that are responsive is determined. The set of nodes may comprise the nodes within the cluster that are responsive or announcing themselves as alive over a network connecting the cluster. The set of nodes may be determined in response to detecting that the first node has failed.

In step 910, a set of priority values corresponding with the set of nodes is generated. In one embodiment, given a number (N) of nodes in a cluster from node(0) to node(N−1), for a floating IP address (i), the priority value of node(j) may be assigned (j−i) modulo N. In one example, node(j) may assume floating IP address (i) only if its priority value is greater than that of any other node in the cluster that is alive and announcing itself on the network. In another embodiment, given a number (N) of nodes in a cluster from node(0) to node(N−1), for a floating IP address (i), the priority value of node(j) may be (i−j) modulo N. In one example, node(j) may assume floating IP address (i) only if its priority value is less than that of any other node in the cluster that is alive and announcing itself on the network. In step 912, it is determined that the second node is associated with a highest priority value of the set of priority values. In step 914, the first floating IP address is assigned to the second node in response to determining that the second node is associated with the highest priority value. In one embodiment, after the first floating IP address has been assigned to the second node, the second node may be responsive to and communicate with a hypervisor that is configured to communicate with the cluster using the first floating IP address. In other embodiments, it may be determined that the second node is associated with a lowest priority value of the set of priority values and the first floating IP address may be assigned to the second node in response to determining that the second node is associated with the lowest priority value.

In some embodiments, it may be determined that the second node should be assigned the first floating IP address based on a set of virtual machines that were running on the first node when the first node failed. Upon detection that the first node has failed, a set of virtual machines that were running on the first node when the first node failed may be identified, a subset of the set of nodes within the cluster that are running the set of virtual machines may be identified, and a subset of the set of priority values corresponding with the subset of the set of nodes may be determined. The second node may then be determined based on a highest priority value of the subset of the set of priority values. In one example, the first node may have been running three virtual machines when the first node failed. The subset of the set of nodes may comprise nodes within the cluster that are currently running the three virtual machines. In some cases, the subset of the set of nodes may comprise nodes within the cluster that are currently running at least two of the three virtual machines. The subset of the set of priority values may correspond with priority values generated for the subset of the set of nodes. The second node may then be identified as the node within the subset of the set of nodes with the highest priority value of the subset of the set of priority values. In another example, if a virtual machine's data resides on nodes 1, 4, and 6 in a cluster and node 1 fails, then nodes 4 and 6 may be given a higher priority and either node 4 or node 6 may be assigned the floating IP address associated with node 1. Upon detection that the first node is back up, the second node may release the first floating IP address.

Figure 10:
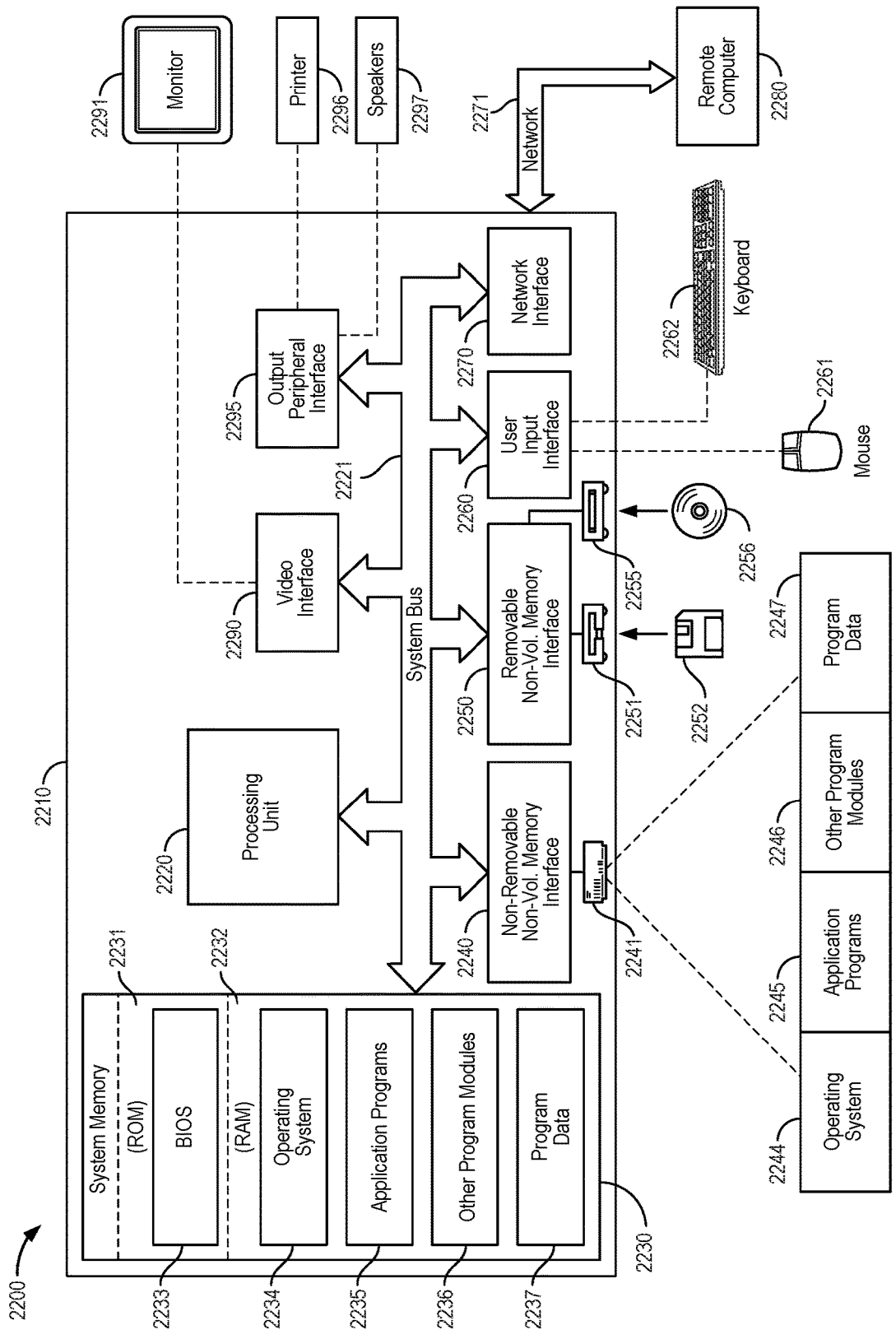
FIG. 10 depicts one embodiment of a computing system environment.

The disclosed technology may be used within various computing system environments. FIG. 10 depicts one embodiment of a computing system environment 2200. In one example, computing system environment 2200 may include one or more computing devices, such as computing device 154 in FIG. 1A. As depicted, computing system environment 2200 includes a general purpose computing device in the form of a computer 2210. Components of computer 2210 may include, but are not limited to, a processing unit 2220, a system memory 2230, and a system bus 2221 that couples various system components including the system memory 2230 to the processing unit 2220. The system bus 2221 may be any of several types of bus structures including a memory bus, a peripheral bus, or a local bus using any of a variety of bus architectures.

Computer 2210 may include a variety of computer readable storage devices. The computer readable storage devices may include volatile storage devices, non-volatile storage devices, removable storage devices, and non-removable storage devices. The computer readable storage devices may be used to store computer readable instructions, data structures, program modules, and other computer readable data. The computer readable storage devices may include a random access memory (RAM), read only memory (ROM), flash-based memory, solid-state memory, optical storage device, magnetic storage device, magnetic tape, or any other data storage device or non-transitory medium which may be used to store computer readable data.

The system memory 2230 may include ROM 2231 and RAM 2232. A basic input/output system 2233 (BIOS) containing routines for transferring information between elements within computer 2210, such as during start-up, may be stored using ROM 2231. RAM 2232 may store data and/or program modules that are accessible to processing unit 2220. The system memory 2230 may store operating system 2234, application programs 2235, other program modules 2236, and program data 2237. The computer 2210 may include a hard disk drive 2241, a magnetic disk drive 2251 that reads from or writes to a removable, nonvolatile magnetic disk 2252, and an optical disk drive 2255 that reads from or writes to a removable, nonvolatile optical disk 2256. The hard disk drive 2241 may be used to store operating system 2244, application programs 2245, other program modules 2246, and program data 2247. In some cases, the data stored on the hard disk drive 2241 may be copied to RAM 2232 and executed by the processing unit 2220. The hard disk drive 2241 may be connected to the system bus 2221 through a memory interface 2240. The magnetic disk drive 2251 and the optical disk drive 2255 may be connected to the system bus 2221 via a memory interface 2250.

An end user of the computer 2210 may enter commands and information into computer 2210 through input devices such as a keyboard 2262 and mouse 2261. The input devices may be connected to the processing unit 2220 through a user input interface 2260 that is coupled to the system bus 2221. A monitor 2291 or other type of display device may be connected to the system bus 2221 via an interface, such as video interface 2290. Peripheral output devices such as speakers 2297 and printer 2296 may be connected to the computer 2210 via an output peripheral interface 2295. The computer 2210 may operate in a networked computing environment, such as networked computing environment 100 in FIG. 1A, and connect to a remote computer 2280 via a network 2271. The computer 2210 may connect to the network 2271 using a network interface 2270. The network 2271 may include a local area network (LAN), a wide area network (WAN), or the Internet. The remote computer 2280 may comprise a computing device, such as a personal computer, a server, or a mobile computing device.

The disclosed technology may be described in the context of computer-executable instructions, such as software or program modules, being executed by a computer or processor. The computer-executable instructions may comprise portions of computer program code, routines, programs, objects, software components, data structures, or other types of computer-related structures that may be used to perform processes using a computer. In some cases, hardware or combinations of hardware and software may be substituted for software or used in place of software.

Computer program code used for implementing various operations or aspects of the disclosed technology may be developed using one or more programming languages, including an object oriented programming language such as Java or C++, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for operating a data management system, comprising:
   acquiring an instruction from a computing device;
   detecting that a second version of a second virtual machine should be generated based on the instruction;
   concurrently acquiring a base image associated with a first version of a first virtual machine different from the second virtual machine from a first storage device of a first type while acquiring one or more incremental files associated with the second virtual machine from a second storage device of a second type in response to detecting that the second version of the second virtual machine should be generated;

generating at least a portion of a file corresponding with the second version of the second virtual machine by patching the one or more incremental files associated with the second virtual machine to the base image associated with the first virtual machine;

acquiring a full image snapshot corresponding with a third version of a third virtual machine;

generating a third signature for the third version of the third virtual machine, the generating the third signature includes generating a plurality of hash values corresponding with a plurality of data blocks within the full image snapshot, the plurality of data blocks is arranged such that data blocks of a first plurality of the plurality of data blocks are spaced at a fixed distance from each other and data blocks of a second plurality of the plurality of data blocks are spaced at monotonically increasing distances from each other;

comparing the third signature for the third version of the third virtual machine with a first signature for the first version of the first virtual machine;

generating a dependent base file comprising data differences between the first version of the first virtual machine and the third version of the third virtual machine;

storing the dependent base file using the second storage device of the second type;

acquiring a second instruction from the computing device;

detecting that the third version of the third virtual machine should be generated based on the second instruction;

concurrently acquiring the base image associated with the first version of the first virtual machine from the first storage device of the first type while acquiring the dependent base file from the second storage device of the second type in response to detecting that the third version of the third virtual machine should be generated, generating at least a portion of a fourth file corresponding with the third version of the third virtual machine using the base image associated with the first version of the first virtual machine and the dependent base file; and transmitting the at least the portion of the fourth file to the computing device.

2. The method of claim 1, wherein:
the concurrently acquiring the base image associated with the first version of the first virtual machine while acquiring the one or more incremental files associated with the second virtual machine includes sequentially reading the base image from the first storage device of the first type while reading the one or more incremental files from the second storage device of the second type.

3. The method of claim 1, wherein:
the first plurality corresponds with a first data region within the full image snapshot; and
the second plurality corresponds with a second data region within the full image snapshot that does not overlap with the first data region.

4. The method of claim 3, wherein:
each data block of the first plurality is separated by a fixed data length; and
each data block of the second plurality is separated by an increasing data length.

5. The method of claim 1, wherein:
the plurality of data blocks comprises a plurality of noncontiguous data blocks, each data block of the plurality of noncontiguous data blocks does not overlap with any of the other data blocks of the plurality of noncontiguous data blocks, each data block of the plurality of noncontiguous data blocks does not share a data boundary with any of the other data blocks of the plurality of noncontiguous data blocks.

6. The method of claim 1, wherein:
the generating the plurality of hash values includes applying a cryptographic hash function to each of the plurality of data blocks within the full image snapshot.

7. The method of claim 1, wherein:
the first version of the first virtual machine corresponds with a first state of the first virtual machine at a first point in time; and
the second version of the second virtual machine corresponds with a second state of the second virtual machine at a second point in time subsequent to the first point in time.

8. The method of claim 7, wherein:
the base image comprises a full image snapshot of the first virtual machine at the first point in time; and
the one or more incremental files comprise a plurality of incremental files.

9. The method of claim 1, wherein:
the first storage device of the first type comprises a magnetic storage device; and
the second storage device of the second type comprises a solid-state storage device.

10. The method of claim 9, wherein:
the magnetic storage device comprises a hard disk drive; and
the solid-state storage device comprises a solid-state drive.

11. The method of claim 1, wherein:
the first storage device of the first type has a first read speed; and
the second storage device of the second type has a second read speed that is faster than the first read speed.

12. A data management system, comprising:
a first storage device of a first type;
a second storage device of a second type; and
one or more processors configured to acquire an instruction from a computing device and determine that a second version of a second virtual machine should be generated based on the instruction, the one or more processors configured to concurrently acquire a base image associated with a first version of a first virtual machine different from the second virtual machine from the first storage device of the first type while a plurality of incremental files associated with the second virtual machine are acquired from the second storage device of the second type, the one or more processors configured to generate at least a portion of a file corresponding with the second version of the second virtual machine via application of the plurality of incremental files associated with the second virtual machine to the base image associated with the first virtual machine, the one or more processors configured to transmit the at least the portion of the file to the computing device, wherein the one or more processors configured to acquire a full image snapshot corresponding with a third version of a third virtual machine and generate a third signature for the third version of the third virtual machine, the one or more processors configured to generate a plurality of hash values corresponding with a plurality of data blocks within the full image snapshot, the plurality of data blocks is arranged such that data blocks of a first plurality of the plurality of data blocks are spaced at a fixed distance from each other and data blocks of a second plurality of the plurality of data blocks are spaced at monotonically increasing distances from each other, the one or more processors configured to compare the third signature for the third version of the third virtual machine with a first signature for the first version of the first virtual machine, the one or more processors configured to generate a dependent base file comprising data differences between the first version of the first virtual machine and the third version of the version virtual machine and cause the dependent base file to be written to the second storage device of the second type the one or more processors further configured to acquire a second instruction from the computing device, detecting that the third version of the third virtual machine should be generated based on the second instruction, concurrently acquire the base image associated with the first version of the first virtual machine from the first storage device of the first type while acquiring the dependent base file from the second storage device of the second type in response to detecting that the third version of the third virtual machine should be generated, generate at least a portion of a fourth file corresponding with the third version of the third virtual machine using the base image associated with the first version of the first virtual machine and the dependent base file, and transmit the at least the portion of the fourth file to the computing device.

13. The data management system of claim 12, wherein:
the one or more processors configured to sequentially read the base image from the first storage device of the first type while the plurality of incremental files are read from the second storage device of the second type.

14. The data management system of claim 12, wherein:
the first version of the first virtual machine corresponds with a first state of the first virtual machine at a first point in time; and
the second version of the second virtual machine corresponds with a second state of the second virtual machine at a second point in time subsequent to the first point in time.

15. The data management system of claim 14, wherein:
the base image comprises a full image snapshot of the first virtual machine at the first point in time.

16. The data management system of claim 12, wherein:
the first storage device of the first type comprises a magnetic storage device; and
the second storage device of the second type comprises a solid-state storage device.

17. A computer-implemented method for operating a data management system, comprising:
acquiring an instruction from a computing device;
detecting that a second version of a second virtual machine should be generated based on the instruction;
concurrently acquiring a base image associated with a first version of a first virtual machine different from the second virtual machine from a first storage device of a first type while acquiring one or more incremental files associated with the second virtual machine from a second storage device of a second type in response to detecting that the second version of the second virtual machine should be generated and sequentially reading the base image from the first storage device of the first type while reading the one or more incremental files from the second storage device of the second type;
generating at least a portion of a file corresponding with the second version of the second virtual machine by patching the one or more incremental files associated with the second virtual machine to the base image associated with the first virtual machine;
acquiring a full image snapshot corresponding with a third version of a third virtual machine;
generating a third signature for the third version of the third virtual machine, the generating the third signature includes generating a plurality of hash values corresponding with a plurality of data blocks within the full image snapshot, the plurality of data blocks is arranged such that data blocks of a first plurality of the plurality of data blocks are spaced at a fixed distance from each other and data blocks of a second plurality of the plurality of data blocks are spaced at monotonically increasing distances from each other;
comparing the third signature for the third version of the third virtual machine with a first signature for the first version of the first virtual machine;
generating a dependent base file comprising data differences between the first version of the first virtual machine and the third version of the third virtual machine;
storing the dependent base file using the second storage device of the second type;
acquiring a second instruction from the computing device;
detecting that the third version of the third virtual machine should be generated based on the second instruction;
concurrently acquiring the base image associated with the first version of the first virtual machine from the first storage device of the first type while acquiring the dependent base file from the second storage device of the second type in response to detecting that the third version of the third virtual machine should be generated;
generating at least a portion of a fourth file corresponding with the third version of the third virtual machine using the base image associated with the first version of the first virtual machine and the dependent base file; and
transmitting the at least the portion of the fourth file to the computing device.

18. The method of claim 17, wherein:
each data block of the first plurality is separated by a fixed data length, and each data block of the second plurality is separated by an increasing data length.

19. The method of claim 17, wherein:
the plurality of data blocks comprises a plurality of noncontiguous data blocks, each data block of the plurality of noncontiguous data blocks does not overlap with any of the other data blocks of the plurality of noncontiguous data blocks, each data block of the plurality of noncontiguous data blocks does not share a data boundary with any of the other data blocks of the plurality of noncontiguous data blocks.

20. The method of claim 17, wherein:
the generating the plurality of hash values includes applying a cryptographic hash function to each of the plurality of data blocks within the full image snapshot.

* * * * *